US011869481B2

(12) United States Patent
Liu

(10) Patent No.: US 11,869,481 B2
(45) Date of Patent: Jan. 9, 2024

(54) SPEECH SIGNAL RECOGNITION METHOD AND DEVICE

(71) Applicant: Alibaba Group Holding Limited, Grand Cayman (KY)

(72) Inventor: Yong Liu, Beijing (CN)

(73) Assignee: Alibaba Group Holding Limited, George Town (KY)

(*) Notice: Subject to any disclaimer, the term of this patent is extended or adjusted under 35 U.S.C. 154(b) by 109 days.

(21) Appl. No.: 16/205,085

(22) Filed: Nov. 29, 2018

(65) Prior Publication Data

US 2019/0164567 A1 May 30, 2019

(30) Foreign Application Priority Data

Nov. 30, 2017 (CN) .......................... 201711241113.0

(51) Int. Cl.
  *G10L 25/78* (2013.01)
  *H04R 3/00* (2006.01)
  *H04R 1/40* (2006.01)
  *G10L 15/22* (2006.01)
  *G10L 21/0216* (2013.01)

(52) U.S. Cl.
  CPC .............. *G10L 25/78* (2013.01); *G10L 15/22* (2013.01); *H04R 1/406* (2013.01); *H04R 3/005* (2013.01); *G10L 2021/02166* (2013.01)

(58) Field of Classification Search
  CPC ...................................................... G10L 15/20
  See application file for complete search history.

(56) References Cited

U.S. PATENT DOCUMENTS

| 6,449,593 | B1 | 9/2002 | Valve |
| 6,453,041 | B1 | 9/2002 | Eryilmaz |
| 6,471,420 | B1 | 10/2002 | Maekawa et al. |
| 6,707,910 | B1 | 3/2004 | Valve et al. |

(Continued)

FOREIGN PATENT DOCUMENTS

| CN | 1617606 A | 5/2005 |
| CN | 102819009 A | 12/2012 |

(Continued)

OTHER PUBLICATIONS

The PCT Search Report and Written Opinion dated Feb. 26, 2019 for PCT Application No. PCT/US2018/063156, 7 pages.

(Continued)

*Primary Examiner* — Anne L Thomas-Homescu
(74) *Attorney, Agent, or Firm* — Lee & Hayes, P.C.

(57) ABSTRACT

Systems and methods are directed to improving speech signal recognition. A method includes obtaining a spatial audio signal; separating a continuous speech signal and a corresponding directivity flag signal for a sound source direction from the spatial audio signal; and combining the continuous speech signal with the corresponding directivity flag signal for the sound source direction to generate a speech activation detection signal for the sound source direction. Because the speech activation detection signal of the sound source direction is obtained by combining the continuous speech signal with the directivity flag signal of the sound source direction, the speech activation detection signal has directivity, reducing the interference from continuous speech signal in other sound source directions.

11 Claims, 21 Drawing Sheets

(56) References Cited

U.S. PATENT DOCUMENTS

| | | | |
|---|---|---|---|
| 7,783,061 B2 | 8/2010 | Zalewski et al. | |
| 7,966,178 B2 | 6/2011 | Gustavsson | |
| 8,073,157 B2 | 12/2011 | Mao et al. | |
| 9,250,703 B2 | 2/2016 | Hernandez-Abrego et al. | |
| 9,305,567 B2 | 4/2016 | Visser et al. | |
| 9,431,029 B2 | 8/2016 | Yook et al. | |
| 9,734,845 B1* | 8/2017 | Liu | H04R 3/005 |
| 10,049,686 B1* | 8/2018 | Hera | G10L 21/0208 |
| 10,157,611 B1* | 12/2018 | Wolff | G10L 15/14 |
| 10,475,440 B2* | 11/2019 | Hiroe | G10L 15/28 |
| 2005/0060148 A1* | 3/2005 | Masuda | G10L 17/00 704/231 |
| 2005/0254640 A1* | 11/2005 | Ohki | H04R 3/02 379/406.1 |
| 2006/0153360 A1* | 7/2006 | Kellermann | H04M 9/082 379/406.08 |
| 2006/0198536 A1* | 9/2006 | Kushida | G10L 25/90 381/92 |
| 2006/0287859 A1* | 12/2006 | Hetherington | G10L 25/87 704/E11.005 |
| 2011/0131042 A1* | 6/2011 | Nagatomo | G10L 15/18 704/240 |
| 2011/0264447 A1 | 10/2011 | Visser | |
| 2011/0288860 A1* | 11/2011 | Schevciw | G10L 25/78 704/233 |
| 2013/0022189 A1* | 1/2013 | Ganong, III | G10L 15/00 379/202.01 |
| 2013/0024196 A1* | 1/2013 | Ganong, III | H04M 3/569 704/246 |
| 2013/0144622 A1* | 6/2013 | Yamada | G10L 25/00 704/248 |
| 2014/0244267 A1* | 8/2014 | Levi | G10L 15/22 704/275 |
| 2015/0046161 A1* | 2/2015 | Locker | G09B 5/00 704/246 |
| 2015/0170645 A1* | 6/2015 | Di Censo | G10K 11/1783 704/275 |
| 2015/0279356 A1* | 10/2015 | Lee | G10L 15/24 704/251 |
| 2016/0029111 A1* | 1/2016 | Wacquant | H04R 3/005 381/86 |
| 2016/0041941 A1* | 2/2016 | Kessler | H04L 12/4035 700/3 |
| 2016/0055850 A1* | 2/2016 | Nakadai | G10L 15/32 704/235 |
| 2016/0100092 A1* | 4/2016 | Bohac | G06F 3/16 382/103 |
| 2016/0104486 A1* | 4/2016 | Penilla | G10L 15/02 704/232 |
| 2016/0307571 A1* | 10/2016 | Mizumoto | H04L 12/1831 |
| 2017/0013354 A1* | 1/2017 | Yang | G06F 3/162 |
| 2017/0034474 A1* | 2/2017 | Goto | G06F 3/167 |
| 2017/0083275 A1* | 3/2017 | Shin | G06F 3/1454 |
| 2017/0150254 A1* | 5/2017 | Bakish | H04R 1/326 |
| 2017/0220502 A1* | 8/2017 | Kessler | G06F 13/4282 |
| 2017/0222790 A1* | 8/2017 | Hooper | H04H 60/00 |
| 2017/0222829 A1* | 8/2017 | Kessler | H04L 12/40058 |
| 2017/0263245 A1* | 9/2017 | Mizumoto | G10L 15/26 |
| 2017/0270919 A1* | 9/2017 | Parthasarathi | G10L 25/87 |
| 2017/0280235 A1* | 9/2017 | Varerkar | G10L 15/02 |
| 2017/0309297 A1* | 10/2017 | Arsikere | G10L 25/87 |
| 2018/0033447 A1* | 2/2018 | Ramprashad | G10L 21/0216 |
| 2018/0061433 A1* | 3/2018 | Kida | G10L 21/028 |
| 2018/0158462 A1* | 6/2018 | Page | G10L 17/00 |
| 2018/0249245 A1* | 8/2018 | Secall | H04R 3/005 |
| 2018/0261200 A1* | 9/2018 | Kang | G10K 11/17875 |
| 2018/0261216 A1* | 9/2018 | Leeb | G10L 15/1815 |
| 2018/0277120 A1* | 9/2018 | Hirohata | G06F 3/167 |
| 2018/0286411 A1* | 10/2018 | Nakadai | G01S 3/8006 |
| 2018/0358013 A1* | 12/2018 | Yoon | G10L 15/22 |
| 2019/0278733 A1* | 9/2019 | Kessler | G05B 19/0421 |
| 2020/0152197 A1* | 5/2020 | Penilla | H04L 67/12 |
| 2022/0277744 A1* | 9/2022 | Mohammad | G10K 11/17881 |

FOREIGN PATENT DOCUMENTS

| | | | | |
|---|---|---|---|---|
| CN | 106504763 A | 3/2017 | | |
| CN | 107358959 A | 11/2017 | | |
| WO | WO-2015086895 A1 * | 6/2015 | | G10L 21/02 |
| WO | WO-2017022879 A1 * | 2/2017 | | B60K 35/00 |

OTHER PUBLICATIONS

The Chinese Office Action dated Nov. 28, 2022 for CN Application No. 201711241113.0, 19 pages.

* cited by examiner

SPEECH SIGNAL RECOGNITION METHOD AND DEVICE

CROSS REFERENCE TO RELATED PATENT APPLICATIONS

This application claims priority to Chinese Patent Application No. 201711241113.0, filed on Nov. 30, 2017, entitled "Speech Signal Recognition Method and Device" which is hereby incorporated by reference in their entirety.

TECHNICAL FIELD

The present disclosure relates to the field of signal processing technology, and, in particular, to speech signal recognition methods and speech signal recognition devices.

BACKGROUND

In a multi-person speech interaction scenario, Speech Activity Detection (VAD) is usually used to monitor each person's speech. For example, in a conference, speech activation detection may be used to monitor the speech of each speaker, and then the speech is recognized and recorded, thereby obtaining a meeting record for each speaker. For another example, when driving a car, the in-vehicle terminal may recognize the speech activation to monitor the driver's speech, then recognize the speech of the driver, and execute required operations of the user according to the speech of the driver, such as waking up the in-vehicle terminal, playing music, answering calls, etc.

However, the main problem with speech activation detection at present is that it is impossible to accurately monitor each person's speech when multiple people are speaking at the same time.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure have been made in order to provide a speech signal recognition method and a corresponding speech signal recognition apparatus that overcome the above problems or at least partially solve the above problems.

In order to solve the above problems, embodiments of the present disclosure disclose a speech signal recognition method, which includes the following.

A spatial audio signal in designated space is obtained.

According to the spatial audio signal, the continuous speech signal and the corresponding directivity flag signal for the plurality of sound source directions are separated from the spatial audio signal.

For a sound source direction of the plurality of sound source directions, the continuous speech signal is combined with the corresponding directivity flag signal for the sound source direction to generate the speech activation detection signal for the sound source direction.

In an example embodiment, the spatial audio signal includes a plurality of original audio signals collected by a plurality of microphones. The step in which according to the spatial audio signal, the continuous speech signal and the corresponding directivity flag signal for the plurality of sound source directions are separated from the spatial audio signal includes the following.

According to the plurality of original audio signals, the signal arrival direction is estimated.

A directivity flag signal for the preset sound source direction is generated according to the signal arrival direction and the preset sound source direction.

A beamforming processing is performed on the plurality of original audio signals to generate the continuous speech signal for the sound source direction.

In an example embodiment, the step in which the beamforming processing is performed on the plurality of original audio signals to generate the continuous speech signal for the sound source direction includes the following.

A delay difference between every two signals in the plurality of original audio signals is determined.

A delay compensation is performed on the plurality of original audio signals according to the delay difference between every two signals.

A weighted summation is performed on the plurality of original audio signals after the delay compensation to generate the continuous speech signal for the sound source direction.

In an example embodiment, the step in which, for a sound source direction of the plurality of sound source directions, the continuous speech signal and the corresponding directivity flag signal for the sound source direction are combined to generate the speech activation detection signal for the sound source direction includes the following.

The directivity flag signal corresponding to each frame of the continuous speech signal is determined.

Each frame of the continuous speech signal is determined as the speech signal or the non-speech signal frame by frame.

According to the determination result of each frame of the continuous speech signal and the corresponding directivity flag signal, each frame of the continuous speech signal is determined as the speech signal or the non-speech signal.

The signal in each frame of the continuous speech signal that is set to be the speech signal is determined as the speech activation detection signal.

In an example embodiment, after according to the determination result of each frame of the continuous speech signal and the corresponding directivity flag signal, each frame of the continuous speech signal is determined as the speech signal or the non-speech signal, further includes the following.

the duration of the non-speech segment is determined. The non-speech segment is a segment composed of each successive frame of the continuous speech signal that is set to be the non-speech signal.

each frame of the continuous speech signal in the non-speech segment of which the duration is less than the first preset threshold is set to be the speech signal.

In an example embodiment, the directivity flag signal indicates that there is the speech signal or the non-speech signal at the time of each frame. The step of according to the determination result of each frame of the continuous speech signal and the corresponding directivity flag signal, each frame of the continuous speech signal is determined as the speech signal or the non-speech signal includes to following.

If the determination result of the current frame of the continuous speech signal is the speech signal, and the corresponding directivity flag signal indicates that there is the speech signal at the time of the current frame, the current frame of the continuous speech signal is set to be the speech signal.

In an example embodiment, the directivity flag signal indicates that there is the speech signal or the non-speech signal at the time of each frame. The according to the determination result of each frame of the continuous speech signal and the corresponding directivity flag signal, each frame of the continuous speech signal is determined as the speech signal or the non-speech signal the step of includes:

If the determination result of the current frame of the continuous speech signal is the speech signal, or the corresponding directivity flag signal indicates that there is the speech signal at the time of the current frame, the current frame of the continuous speech signal is set to be the speech signal.

In an example embodiment, each frame of the continuous speech signal is determined as the speech signal or the non-speech signal frame by frame the step of includes:

The continuous speech signal is input into a preset neural network model. Each frame of the continuous speech signal is determined as the speech signal or the non-speech signal frame by frame.

In an example embodiment, prior to the directivity flag signal corresponding to the each frame of the continuous speech signal is determined, the method further includes the following.

The duration of the non-speech indication segment is determined. The non-speech indication segment is composed of the continuous directivity flag signal indicating that there is the non-speech signal at the time of the current frame.

The directivity flag signal of each frame of the non-speech indication segment having a duration less than a second preset threshold is set to indicate that there is the speech signal at the time of the current frame.

Embodiments of the present disclosure also disclose a speech signal recognition method, which includes the following.

A spatial audio signal in a vehicle is obtained.

According to the spatial audio signal, the continuous speech signal and the corresponding directivity flag signal for the plurality of sound source directions are separated from the spatial audio signal.

For a sound source direction of the plurality of sound source directions, the continuous speech signal is combined with the corresponding directivity flag signal for the sound source direction to generate the speech activation detection signal for the sound source direction.

In an example embodiment, the spatial audio signal includes a plurality of original audio signals collected by a plurality of microphones. The step in which according to the spatial audio signal, the continuous speech signal and the corresponding directivity flag signal for the plurality of sound source directions are separated from the spatial audio signal includes the following.

According to the plurality of original audio signals, the signal arrival direction is estimated.

The directivity flag signal for the preset sound source direction is generated according to the signal arrival direction and the preset sound source direction.

A beamforming processing is performed on the plurality of original audio signals to generate the continuous speech signal for the sound source direction.

In an example embodiment, the step in which the beamforming processing is performed on the plurality of original audio signals to generate the continuous speech signal for the sound source direction includes the following.

A delay difference between every two signals in the plurality of original audio signals is determined.

A delay compensation is performed on the plurality of original audio signals according to the delay difference between every two signals.

A weighted summation is performed on the plurality of original audio signals after the delay compensation to generate the continuous speech signal for the sound source direction.

In an example embodiment, the step in which for a sound source direction of the plurality of sound source directions, the continuous speech signal is combined with the corresponding directivity flag signal for the sound source direction to generate the speech activation detection signal for the sound source direction includes the following.

The directivity flag signal corresponding to each frame of the continuous speech signal is determined.

Each frame of the continuous speech signal is determined as the speech signal or the non-speech signal frame by frame.

According to the determination result of each frame of the continuous speech signal and the corresponding directivity flag signal, each frame of the continuous speech signal is determined as the speech signal or the non-speech signal.

The signal in each frame of the continuous speech signal that is set to be the speech signal is determined as the speech activation detection signal.

In an example embodiment, after according to the determination result of each frame of the continuous speech signal and the corresponding directivity flag signal, each frame of the continuous speech signal is determined as the speech signal or the non-speech signal, the method further includes the following. The duration of the non-speech segment is determined. The non-speech segment is a segment composed of each successive frame of the continuous speech signal that is set to be the non-speech signal.

Each frame of the continuous speech signal in the non-speech segment of which the duration is less than the first preset threshold is set to be the speech signal.

In an example embodiment, the step in which each frame of the continuous speech signal is determined as the speech signal or the non-speech signal frame by frame includes the following.

The continuous speech signal is input into a preset neural network model. Each frame of the continuous speech signal is determined as the speech signal or the non-speech signal frame by frame.

In an example embodiment, prior to the directivity flag signal corresponding to each frame of the continuous speech signal is determined, the method further includes the following.

The duration of the non-speech indication segment is determined. The non-speech indication segment is composed of the continuous directivity flag signal indicating that there is the non-speech signal at the time of the current frame.

The directivity flag signal of each frame of the non-speech indication segment having a duration less than a second preset threshold is set to indicate that there is the speech signal at the time of the current frame.

Embodiments of the present disclosure also disclose a speech signal recognition method, which includes the following.

A spatial audio signal inside the vehicle sent by the in-vehicle terminal is received.

According to the spatial audio signal, the continuous speech signal and the corresponding directivity flag signal for the plurality of sound source directions are separated from the spatial audio signal.

For a sound source direction of the plurality of sound source directions, the continuous speech signal for the sound source direction is combined with the corresponding directivity flag signal to generate the speech activation detection signal for the sound source direction.

The speech activation detection signal for the sound source direction is sent to the in-vehicle terminal.

In an example embodiment, the spatial audio signal includes a plurality of original audio signals collected by a plurality of microphones. The step in which according to the spatial audio signal, the continuous speech signal and the corresponding directivity flag signal for the plurality of sound source directions are separated from the spatial audio signal includes the following.

According to the plurality of original audio signals, the signal arrival direction is estimated.

A directivity flag signal for the preset sound source direction is generated according to the signal arrival direction and the preset sound source direction.

A beamforming processing is performed on the plurality of original audio signals to generate the continuous speech signal for the sound source direction.

In an example embodiment, the step in which the beamforming processing is performed on the plurality of original audio signals to generate the continuous speech signal for the sound source direction includes the following.

A delay difference between every two signals in the plurality of original audio signals is determined.

A delay compensation is performed on the plurality of original audio signals according to the delay difference between every two signals.

A weighted summation is performed on the plurality of original audio signals after the delay compensation to generate the continuous speech signal for the sound source direction.

In an example embodiment, the step in which for a sound source direction of the plurality of sound source directions, the continuous speech signal is combined with the corresponding directivity flag signal for the sound source direction to generate the speech activation detection signal for the sound source direction includes the following.

The directivity flag signal corresponding to each frame of the continuous speech signal is determined.

Each frame of the continuous speech signal is determined as the speech signal or the non-speech signal frame by frame.

According to the determination result of each frame of the continuous speech signal and the corresponding directivity flag signal, each frame of the continuous speech signal is determined as the speech signal or the non-speech signal.

The signal in each frame of the continuous speech signal that is set to be the speech signal is determined as the speech activation detection signal.

In an example embodiment, after according to the determination result of each frame of the continuous speech signal and the corresponding directivity flag signal, each frame of the continuous speech signal is determined as the speech signal or the non-speech signal, the method further includes the following.

The duration of the non-speech segment is determined. The non-speech segment is a segment composed of each successive frame of the continuous speech signal that is set to be the non-speech signal.

Each frame of the continuous speech signal in the non-speech segment of which the duration is less than the first preset threshold is set to be the speech signal.

In an example embodiment, the step in which each frame of the continuous speech signal is determined as the speech signal or the non-speech signal frame by frame includes the following.

The continuous speech signal is input into a preset neural network model. Each frame of the continuous speech signal is determined as the speech signal or the non-speech signal frame by frame.

In an example embodiment, prior to the directivity flag signal corresponding to each frame of the continuous speech signal is determined, the method further includes the following.

The duration of the non-speech indication segment is determined. The non-speech indication segment is composed of the continuous directivity flag signal indicating that there is the non-speech signal at the time of the current frame.

The directivity flag signal of each frame of the non-speech indication segment having a duration less than a second preset threshold is set to indicate that there is the speech signal at the time of the current frame.

Embodiments of the present disclosure also disclose a speech signal recognition device, which includes the following.

A spatial audio signal acquisition module is configured to obtain a spatial audio signal in the designated space.

A first signal generation module is configured to, according to the spatial audio signal, separate a continuous speech signal and a corresponding directivity flag signal for a plurality of sound source directions from the spatial audio signal.

A second signal generation module is configured to, for a sound source direction of the plurality of sound source directions, combine the continuous speech signal and the corresponding directivity flag signal for the sound source direction to generate the speech activation detection signal for the sound source direction.

Embodiments of the present disclosure also disclose a speech signal recognition device, which includes the following.

A spatial audio signal acquisition module is configured to obtain a spatial audio signal inside the vehicle.

A first signal generation module is configured to, according to the spatial audio signal, separate a continuous speech signal and a corresponding directivity flag signal for a plurality of sound source directions from the spatial audio signal.

A second signal generation module is configured to, for a sound source direction of the plurality of sound source directions, combine the continuous speech signal with the corresponding directivity flag signal for the sound source direction to generate the speech activation detection signal for the sound source direction.

Embodiments of the present disclosure also disclose a speech signal recognition device, which includes the following.

A spatial audio signal receiving module is configured to receive a spatial audio signal inside the vehicle sent by the in-vehicle terminal.

A first signal generation module is configured to, according to the spatial audio signal, separate a continuous speech signal and a corresponding directivity flag signal for a plurality of sound source directions from the spatial audio signal.

A second signal generation module is configured to, for a sound source direction of the plurality of sound source directions, combine the continuous speech signal with the corresponding directivity flag signal for the sound source direction to generate the speech activation detection signal for the sound source direction.

A speech activation detection signal sending module is configured to send the speech activation detection signal of the corresponding sound source direction to the in-vehicle terminal.

Embodiments of the present disclosure also disclose a device, which includes the following.

One or more processors; and

One or more machine-readable media stored thereon instructions that, when executed by the one or more processors, cause the device to perform one or more methods as described above.

Embodiments of the present disclosure also disclose one or more machine-readable media stored thereon instructions that, when executed by the one or more processors, cause the device to perform one or more methods as described above.

Embodiments of the present disclosure include the following advantages:

In example embodiments of the present disclosure, since the speech activation detection signal of the sound source direction is obtained by combining the continuous speech signal with the directivity flag signal of the sound source direction, the speech activation detection signal has directivity, thereby reducing the interference from the continuous speech signal of other sound source directions to the speech activation detection signal of the sound source direction. In the scenario where many people speak, the influence of other people's speech on the current person's speech may be reduced, so that the speech of each person may be clearly monitored.

BRIEF DESCRIPTION OF THE DRAWINGS

In order to more clearly describe technical solutions in the embodiments of the present disclosure, drawings to be used in the description of the embodiments are briefly described herein. Apparently, the described drawings represent some embodiments of the present disclosure. One skilled in the art can also obtain other drawings based on these drawings without making any creative effort.

DETAILED DESCRIPTION

To make the objectives, technical solutions, and advantages of the embodiments of the present disclosure more clear, the technical solutions in the embodiments of the present disclosure are described in a clear and complete manner with reference to the accompanying drawings in the embodiments of the present disclosure. Apparently, the described embodiments represent some and not all of the embodiments of the present disclosure. All other embodiments obtained by one of ordinary skill in the art based on the embodiments of the present disclosure without making creative efforts shall fall within the scope of protection of the present disclosure.

Figure 1:
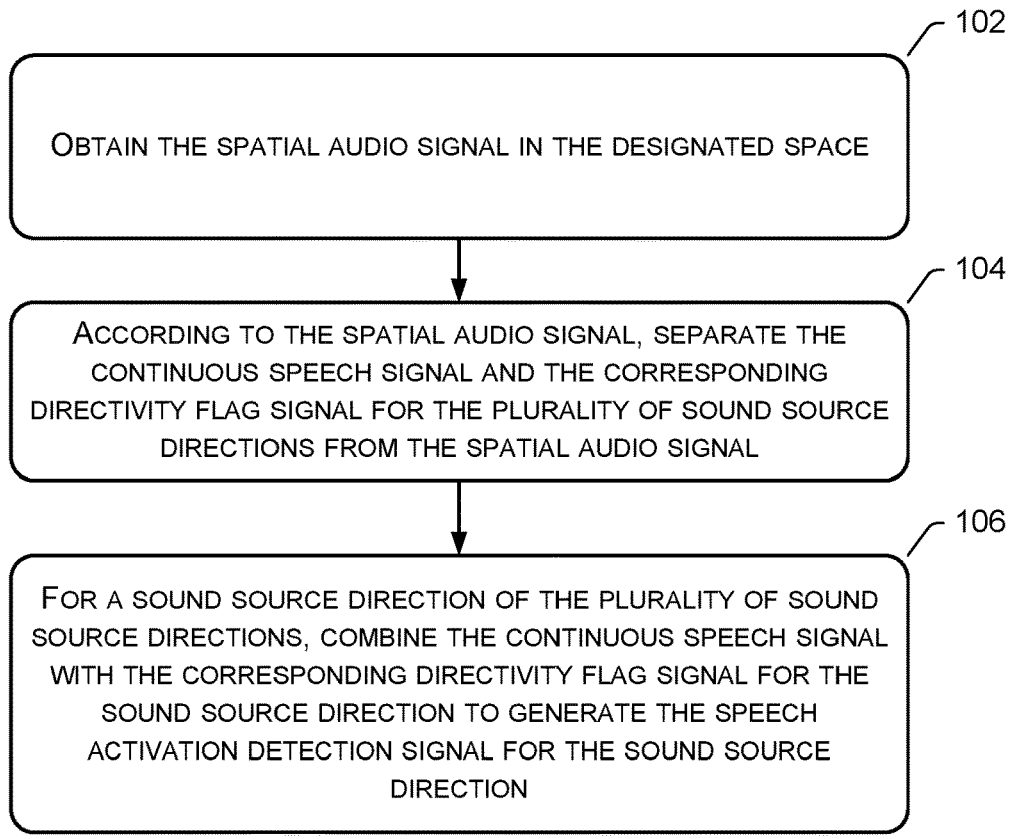
FIG. 1 is a flowchart of Embodiment 1 of a speech signal recognition method of the present disclosure.

Referring to FIG. 1, which is a flowchart of Embodiment 1 of a speech signal recognition method 100 of the present disclosure. Embodiment 1 may include the following.

At block 102, the spatial audio signal in the designated space is obtained.

In example embodiments of the present disclosure, the designated space may be a space inside the vehicle. An audio collecting device (such as a microphone) is placed inside the vehicle to collect the spatial audio signal inside the vehicle.

The spatial audio signal inside the vehicle may include a speech signal of the person in the vehicle and an audio signal played by the vehicle audio playback device (e.g., audio equipment).

At block 104, according to the spatial audio signal, the continuous speech signal and the corresponding directivity flag signal for the plurality of sound source directions are separated from the spatial audio signal.

Sound source direction is the direction of the sound source. For example, the sound source direction may be from the direction of the main driving position, or from the direction of the passenger seat, and from other positions in the car.

The spatial audio signal in the car may be analyzed. The sound source direction is determined. A continuous speech signal and corresponding directivity flag signal for the sound source direction are output.

The continuous speech signal for the sound source direction is a speech signal from the sound source direction obtained by analyzing the spatial audio signal in the car. The continuous speech signal includes a speech signal and a non-speech signal. The speech signal is made by a person. The non-speech signal is a non-human sound signal.

If a plurality of sound source directions is determined, a continuous speech signal for each sound source direction may be separated from the spatial audio signal. For example, a continuous speech signal from the main driver's seat and a continuous speech signal from the front passenger's seat may be separated from the spatial audio signal in the vehicle.

The directivity flag signal indicates whether the sound source direction has a speech signal at each time point. For example, the directivity flag signal for the main driver's seat indicates whether there is a speech at the main driver's seat at various time points. The directivity flag signal for the front passenger's seat indicates whether there is a speech at the front passenger's seat at various time points.

At block 106, for a sound source direction of the plurality of sound source directions, the continuous speech signal is combined with the corresponding directivity flag signal for the sound source direction to generate the speech activation detection signal for the sound source direction.

The continuous speech signal and the corresponding directivity flag signal are combined to generate the speech activation detection signal for the corresponding sound source direction.

For example, combining a continuous speech signal from the main driver's seat with the corresponding directivity flag signal to generate the speech activation detection signal for the main driver's seat. The continuous speech signal from the front passenger's seat and the corresponding directivity flag signal are combined to generate the speech activation detection signal for the front passenger's seat.

In example embodiments of the present disclosure, since the speech activation detection signal of the sound source direction is obtained by combining the continuous speech signal and the directivity flag signal of the sound source direction, the speech activation detection signal has directivity, thereby reducing interference with the speech activation detection signal of the sound source direction from the continuous speech signal of other sound source directions. In the scenario where many people speak, the influence of other people's speech on the current person's speech may be reduced, so that the speech of each person may be clearly monitored.

For example, the speech activation of the main driver's seat is obtained by combining the continuous speech signal from the main driver's seat with the corresponding directivity flag signal. The continuous speech signal from the front passenger's seat will not be combined with the directivity flag signal of the main driver's seat. Thus, the interference with the main driver's seat's speech activation detection signal from the front passenger's seat's continuous speech signal may be reduced.

In example embodiments of the present disclosure, the in-vehicle terminal may determine a sound source direction that makes the sound according to the spatial audio signal in the vehicle, a continuous speech signal from the sound source direction, and the directivity flag signal indicating whether there is a speech signal in the sound source direction at various time points. Then, the continuous speech signal and the corresponding directivity flag signal are combined to obtain a speech activation detection signal for the sound source direction. Therefore, embodiments of the present disclosure may realize monitoring the speech of each sound source direction simultaneously, distinguishing the directivity of each speech, and determining which sound source direction each speech comes from. For example, speeches from the main driver's seat and the front passenger's seat may be simultaneously monitored by the in-vehicle terminal. Finally, the in-vehicle terminal outputs the speech activation detection signal of the main driver's seat and the speech activation detection signal of the front passenger's seat.

The speech activation detection signal is the final determined audio signal for the sound source direction. The in-vehicle terminal may perform speech recognition on the speech activation detection signal, and finally perform subsequent processing according to the recognition result, for example, playing music, answering a call, etc.

Figure 2A:
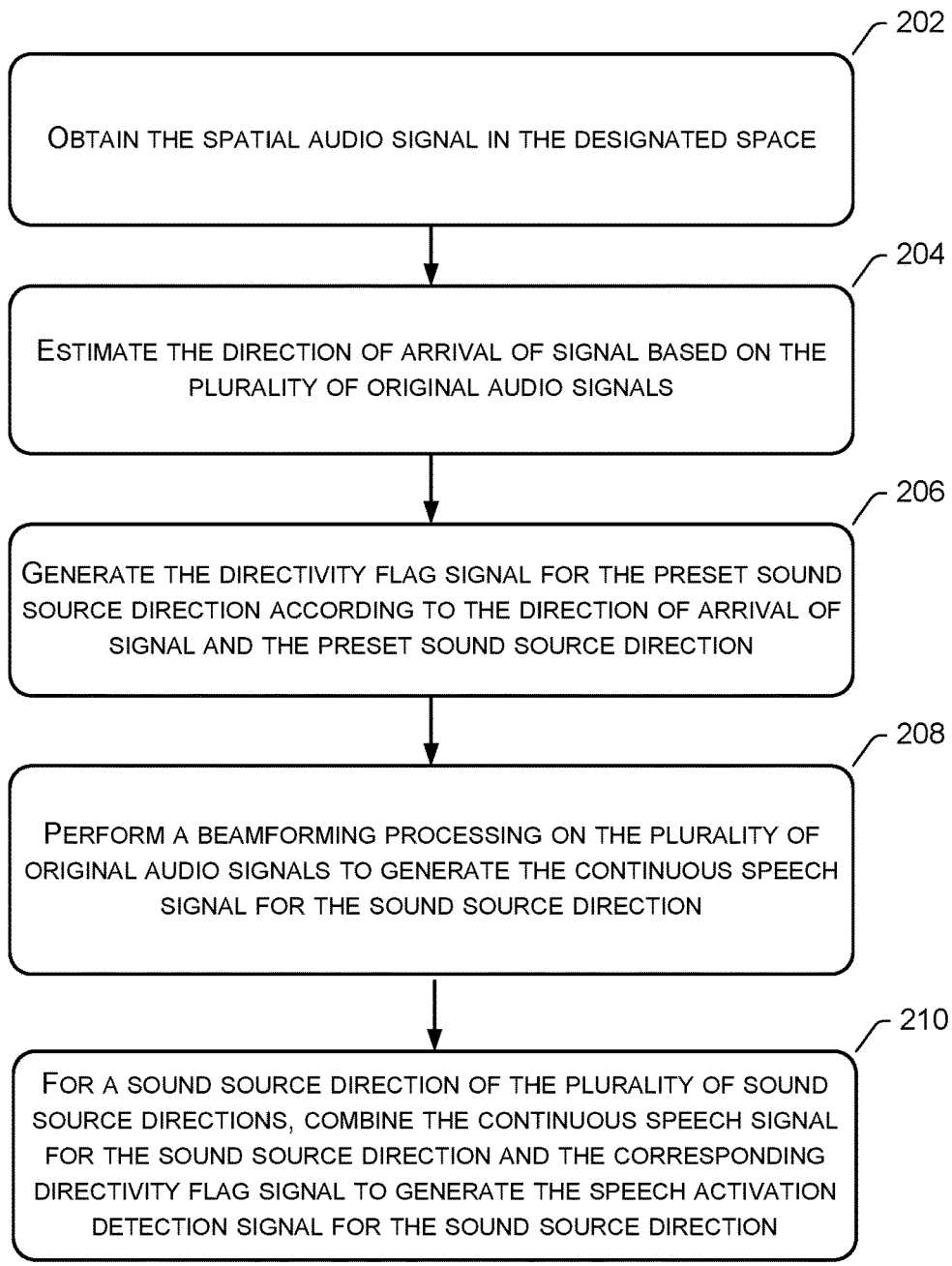
FIG. 2A is a flowchart of Embodiment 2 of a speech signal recognition method of the present disclosure.

Referring to FIG. 2A, a flowchart of Embodiment 2 of a speech signal recognition method 200 of the present disclosure is shown, which may include the following.

At block 202, the spatial audio signal in the designated space is obtained. The spatial audio signal includes a plurality of original audio signals collected by a plurality of microphones.

In example embodiments of the present disclosure, the designated space may be a space inside the vehicle. An audio collecting device is disposed inside the vehicle to collect spatial audio signals inside the vehicle.

In an example embodiment, in example embodiments of the present disclosure, a microphone array may be placed in the vehicle to collect spatial audio signals inside the vehicle. For example, a microphone is placed near the main driver's seat to collect the speech signal of the main driver. A microphone is placed near the front passenger's seat to collect the speech signal of the front passenger. A microphone may be placed in the back seat to collect the speech signal of the back passenger.

Each microphone may collect the speech signal of the person in the vehicle and the audio signal played by the vehicle audio playback device.

At block 204, the signal arrival direction is estimated based on the plurality of original audio signals.

Direction of Arrival (DOA) refers to the direction of the sound source with respect to the microphone array. The estimation of the signal arrival direction is also referred as the sound source orientation. Currently, the method of using the microphone array to locate the sound source may be generally divided into two categories, i.e., time delay estimation and directional beamforming.

Directional beamforming is a form based on a method of the maximum output power controllable beam. This method performs filtering delay on the speech signal received by the microphone array and calculated the weighted sum to form a beam with a specific direction. Then, the beam energy in each specific direction is calculated. The direction with the maximum power in space is searched to be the maximum approximation of the position of the sound source.

Regarding the method of time delay estimation, since the signal from the sound source reaches each microphone with the time difference, the method estimates the time delay according to the correlation between the signal of each channel, so as to estimate the position of the sound source. Such method is fast in the calculation and can meet the real-time requirement.

In an example of embodiments of the present disclosure, the signal arrival direction may be calculated using the Time Difference of Arrival (TDOA) based on time delay difference.

At block 206, the directivity flag signal is generated for the preset sound source direction according to the signal arrival direction and the preset sound source direction.

The preset sound source direction is the direction of the expected sound source relative to the microphone array. If the main driver's seat and the front passenger's seat need to be monitored, the direction of the sound source may be the direction of the main driver's seat and the front passenger's seat. For example, the sound source direction for the main driver's seat may be preset to be 30 degrees, and the sound source direction for the front passenger's seat may be preset to be −30 degrees.

If the signal arrival direction at a certain time point is the same as the preset sound source direction, it may be deemed that there is the speech signal at the time point. Therefore, according to whether the signal arrival direction at various time points is the same as the preset sound source direction, a directivity flag signal indicating whether there is a speech signal in the preset sound source direction at various time points may be generated.

In example embodiments of the present disclosure, the directivity flag signal indicates whether there is the speech signal in the sound source direction at various time points.

For example, the directivity flag signal only includes two values of 0 and 1. 0 indicates that there is no speech signal in this sound source direction at the time point. 1 indicates that there is a speech signal in the sound source direction at the time point.

At block 208, a beamforming processing is performed on the plurality of original audio signals to generate the continuous speech signal for the sound source direction.

Beamforming refers to enhancing the desired speech signal, suppressing the interference source and noise. The single-microphone-based speech enhancement is not ideal with difficulties to obtain a large performance improvement. In this case, the microphone array is constructed to suppress reverberation and noise to obtain higher quality speech. The microphone array forms a beam in the desired direction, picking up the beam signal, eliminating the off-beam noise, and achieving the purpose of speech enhancement.

Figure 2B:
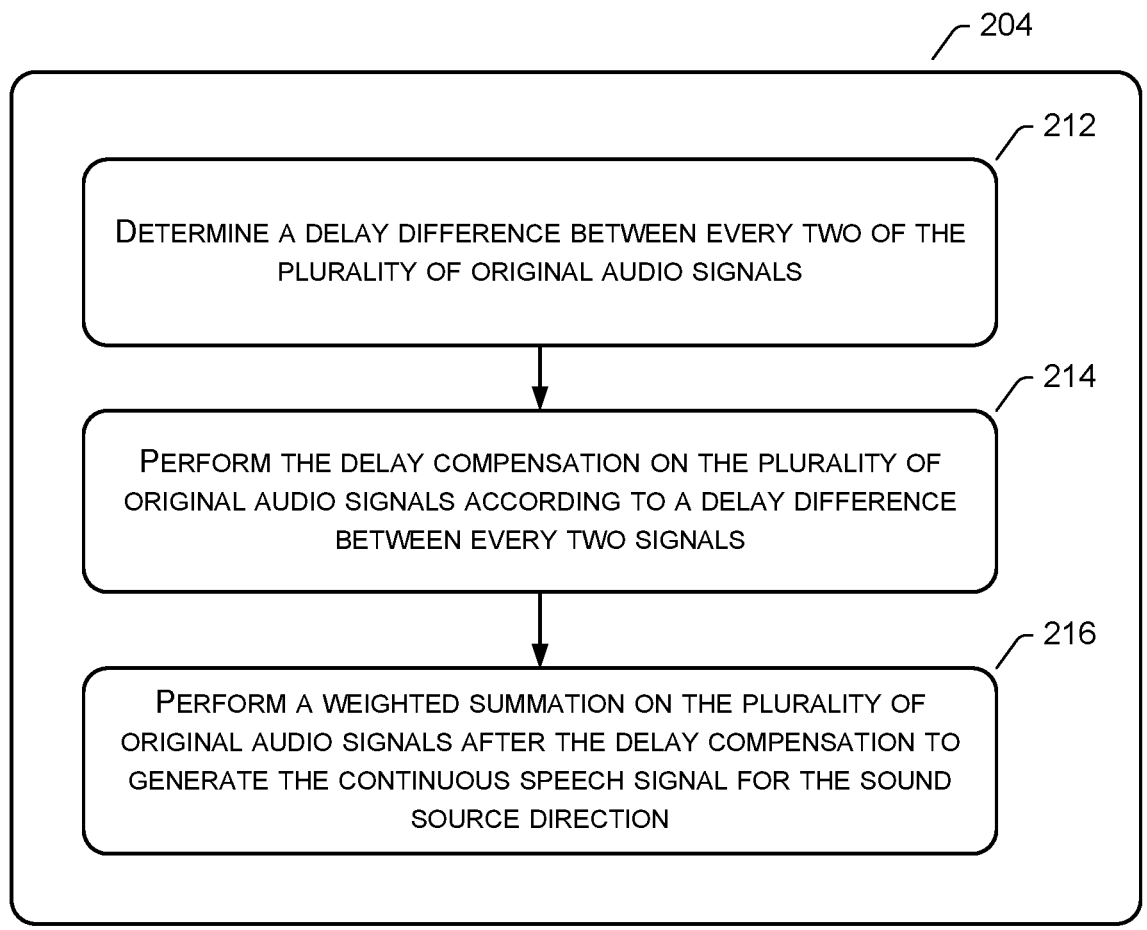
FIG. 2B is a flowchart showing details of block 204 in FIG. 2A.

FIG. 2B is a flowchart showing details of block 204 in FIG. 2A. In example embodiments of the present disclosure, the block 204 may include the following.

At block 212, a delay difference between every two of the plurality of original audio signals is determined.

In example embodiments of the present disclosure, the delay difference may be calculated by the GCC-PHAT (Generalized Cross Correlation-Phase Transform) algorithm based on phase transformation. The GCC-PHAT algorithm uses the correspondence between the cross-correlation function of the signal in the time domain and the cross-power spectral function of the signal in the frequency domain to calculate the cross power spectral density of two original audio signals. Then, weighting and phase transformation are performed. Finally, the inverse Fourier transformation is performed to obtain the generalized cross-correlation function. The moment corresponding to the peak of the generalized cross-correlation function is the delay difference between the two original audio signals.

At block 214, the delay compensation is performed on the plurality of original audio signals according to a delay difference between every two signals.

At block 216, a weighted summation is performed on the plurality of original audio signals after the delay compensation to generate the continuous speech signal for the sound source direction.

After calculating the delay difference, a continuous speech signal for the sound source direction may be generated using Delay-Sum Beamforming (DSB).

Specifically, first, delay compensation is performed on the plurality of original audio signals according to a delay difference between every two signals, so that respective original audio signal is synchronized.

Then, the synchronized respective original audio signals are weighted (for example, uniformly weighted), and the weighted respective original audio signals are added to obtain a continuous speech signal for each sound source direction.

At block 210, for a sound source direction of the plurality of sound source directions, the continuous speech signal and the corresponding directivity flag signal for the sound source direction are combined to generate the speech activation detection signal for the sound source direction.

The continuous speech signal and the corresponding directivity flag signal are combined to generate the speech activation detection signal for the corresponding sound source direction.

In order to enable those skilled in the art to better understand embodiments of the present disclosure, hereinafter, an example is set to explain example embodiments of the present disclosure.

Figure 3:
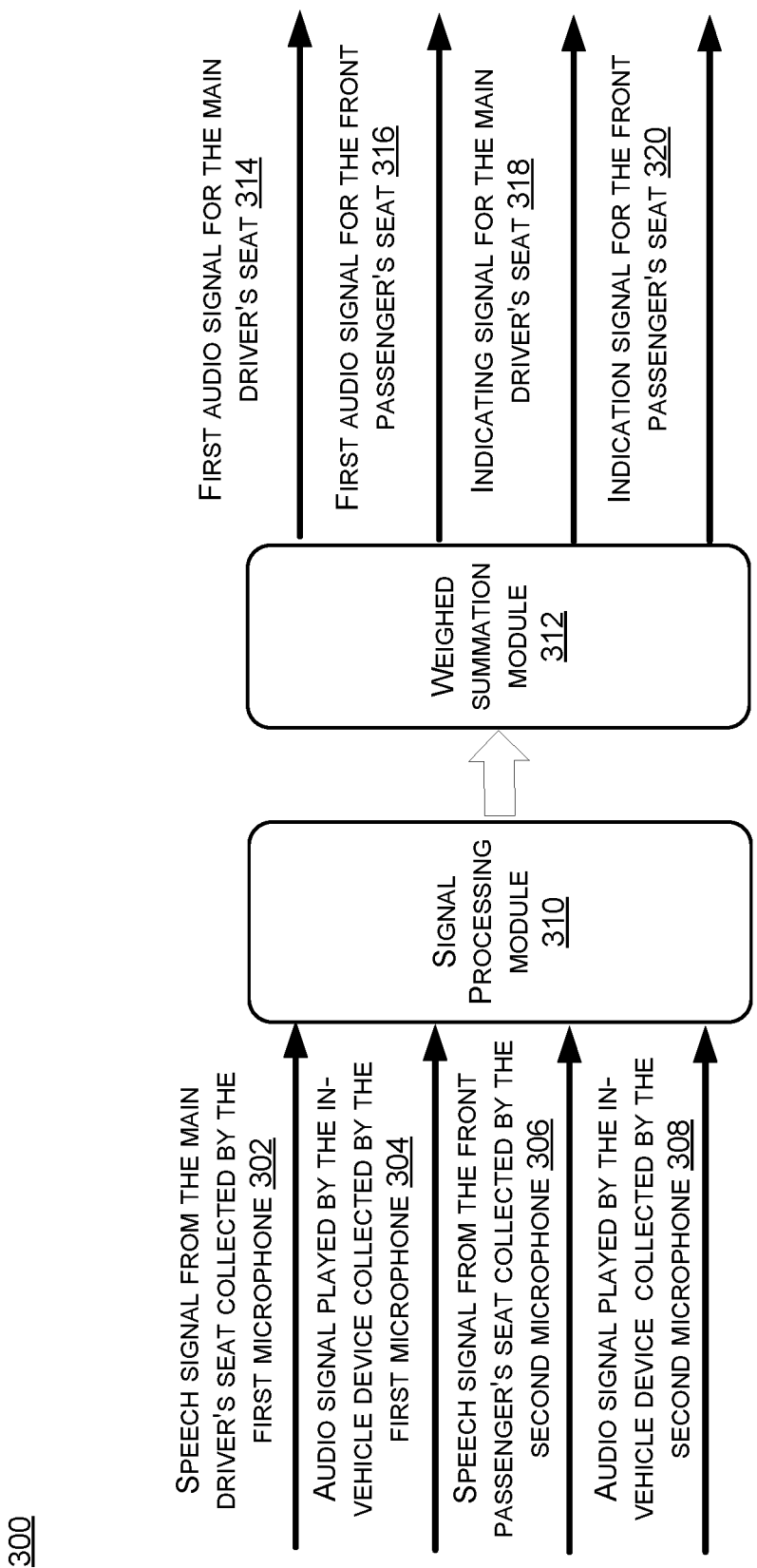
FIG. 3 is a schematic diagram of a continuous speech signal and a corresponding directivity flag signal for the sound source direction in example embodiments of the present disclosure.

Referring to FIG. 3, a schematic diagram of an apparatus 300 for generating the continuous speech signal and the corresponding directivity flag signal for the sound source direction in the embodiments of the present disclosure is shown.

In this example, a first microphone is placed near the main driver's seat and a second microphone is placed near the front passenger's seat.

The first microphone may collect the continuous speech signal 302 from the main driver's seat and the audio signal 304 played by the in-vehicle device. The second microphone may collect the continuous speech signal 306 from the front passenger's seat and the audio signal 308 played by the in-vehicle device. That is, four signals in total are collected. These four signals are input to a signal processing module 310.

The signal processing module 310 may calculate the delay difference using the GCC-PHAT algorithm based on phase transformation. The GCC-PHAT algorithm uses the correspondence between the cross-correlation function of the signal in the time domain and the cross-power spectral function of the signal in the frequency domain to calculate the cross power spectral density of two original audio signals. Then, weighting and phase transformation are performed. Finally, the inverse Fourier transformation is performed to obtain the generalized cross-correlation function. The moment corresponding to the peak of the generalized cross-correlation function is the delay difference between the two original audio signals.

After calculating the delay difference, on one hand, the signal processing module 310 may use the TDOA algorithm (also called arrival time difference estimation method based on the delay difference), to estimate the signal arrival direction according to the delay difference of the four signals.

Then, whether the signal arrival direction at each time is the same as the direction of the main driver's seat or the front passenger's seat is determined. If the signal arrival direction is the same as the direction of the main driver's seat, it is deemed that there is a speech in the direction of the main driver's seat. If the signal arrival direction is different from the direction of the main driver's seat, it is deemed that there is no speech in the direction of the main driver's seat.

If the signal arrival direction is the same as the front passenger's seat direction, it is deemed that there is a speech in the direction of the front passenger's seat. If the signal arrival direction is different from the direction of the front passenger's seat, it is deemed that there is no speech in the direction of the front passenger's seat.

According to whether there is a speech in the direction of the main driver's seat, the directivity flag signal for the main driver's seat may be obtained. According to whether there is a speech in the direction of the front passenger's seat, the directivity flag signal for the front passenger's seat may be obtained.

On the other hand, Delay-Sum Beamforming (DSB) may be used to generate the continuous speech signal for the sound source direction.

According to the delay difference between the two signals, delay compensation is performed on the four signals, so that the four signals are synchronized.

The weighed summation module 312 weighs, for example, uniformly weighs, the four signals after synchronization. The weighed summation module 312 adds the weighted four signals to obtain a first audio signal for the main driver's seat 314, a first audio signal for the front passenger's seat 316, an indicating signal for the main driver's seat 318, and an indication signal for the front passenger's seat 320.

Figure 4:
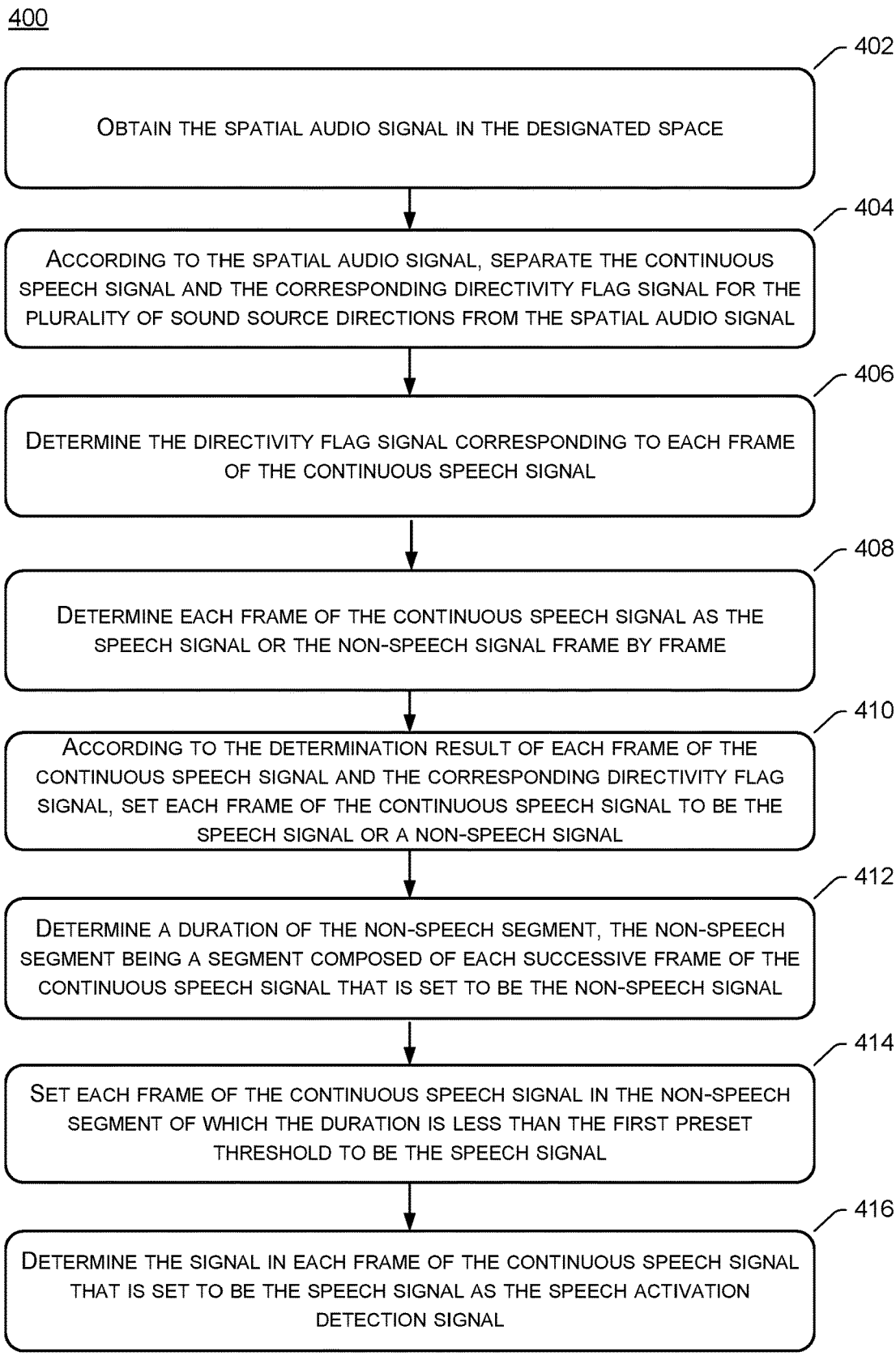
FIG. 4 is a flowchart of Embodiment 3 of a speech signal recognition method of the present disclosure.

Referring to FIG. 4, a flowchart of Embodiment 3 of a speech signal recognition method of the present disclosure is shown, which may include the following.

At block 402, the spatial audio signal in the designated space is obtained.

At block 404, according to the spatial audio signal, the continuous speech signal and the corresponding directivity flag signal for the plurality of sound source directions are separated from the spatial audio signal.

The method for separating a continuous speech signal and a corresponding directivity flag signal for a plurality of sound source directions from the spatial audio signal according to the spatial audio signal may be referred to the above related description and will not be described herein again.

At block 406, the directivity flag signal corresponding to each frame of the continuous speech signal is determined.

In example embodiments of the present disclosure, both the continuous speech signal and the directivity flag signal are continuous signals. First, the continuous speech signal and the directivity flag signal are framed, where the continuous speech signal and the directivity flag signal are divided frame by frame. Then, the corresponding directivity signal of each frame of the continuous speech signal is determined.

In example embodiments of the present disclosure, prior to block 303, the method may further include the following.

A duration of the non-speech indication segment is determined. The non-speech indication segment is composed of the continuous directivity flag signal indicating that there is the non-speech signal at the time of the current frame. The directivity flag signal of each frame of the non-speech indication segment having a duration less than a second preset threshold is set to indicate that there is the speech signal at the time of the current frame.

For example, in the directivity flag signal for the main driver's seat, 0 s-4 s indicates that there is a speech signal, 4 s-4.2 s indicates that there is a non-speech signal, and 4.2 s-8 s indicates that there is a speech signal.

Then, 4 s-4.2 s is the non-speech indication segment. If the second threshold is 0.3 s, the non-speech indication segment is set to indicate that there is a speech signal at the main driver's seat.

At block 408, each frame of the continuous speech signal is determined as the speech signal or the non-speech signal frame by frame.

In example embodiments of the present disclosure, each frame of the continuous speech signal may be determined as the speech signal or a non-speech signal frame by frame by inputting the continuous speech signal into a preset neural network model.

The neural network model may be trained according to the existing speech signal and non-speech signal. For the continuous speech signal input to the model, the probability of the continuous speech signal to be similar to the speech signal and non-speech signal in the training data is calculated on the model. Finally, according to the probability of the continuous speech signal to be similar to the speech signal and the probability of the continuous speech signal to be similar to non-speech signal, whether each frame of the continuous speech signal is speech is determined.

Figure 5:
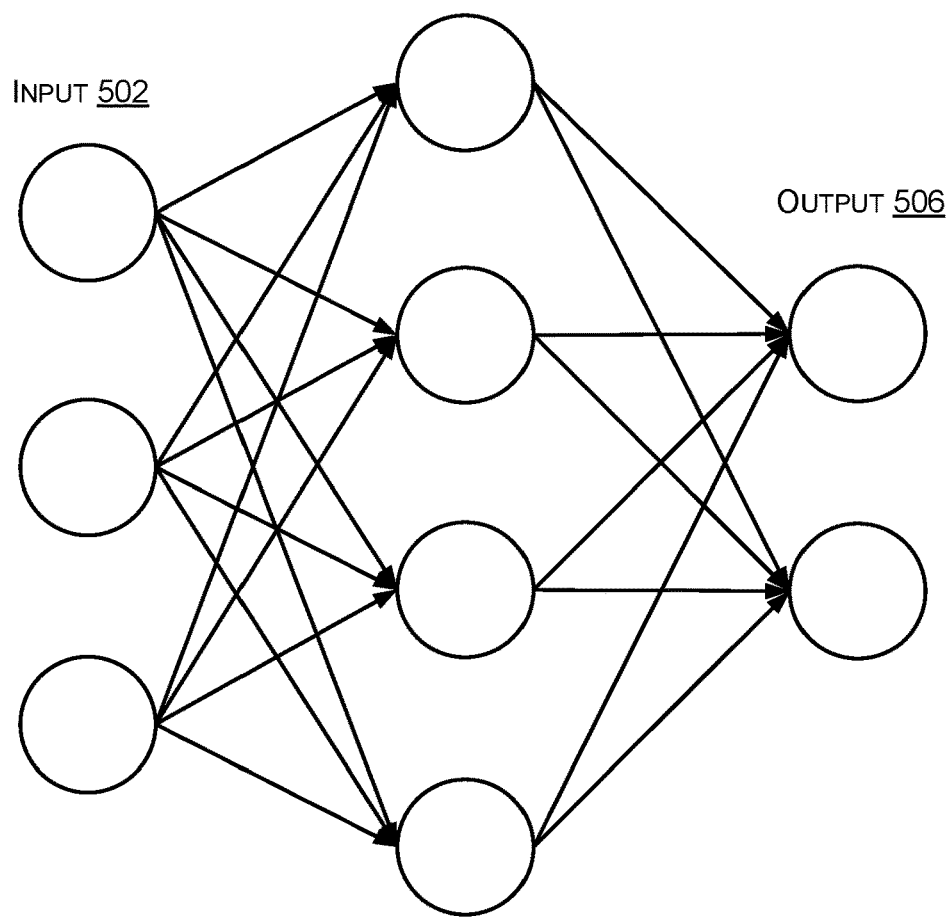
FIG. 5 is a schematic diagram of a neural network model in example embodiments of the present disclosure.

Referring to FIG. 5, which is a schematic diagram of a neural network model 500 in the embodiments of the present disclosure. The neural network model 500 includes an input layer 502, one or more hidden layers 504, and an output layer 506.

Nodes of the input layer 502 correspond to features extracted from the domain, which are usually floating-point data. Each node of the output layer 506 corresponds to a category that needs to be classified. For example, if numeric string recognition needs to be performed, the output node is a category of 0-9.

As shown in the figure, the arrow connection between each node corresponds to a weight. The training process of the neural network model 500 is to obtain values of such weights.

The input of the neural network model 500 is supposed to be a vector x, and the output is supposed to be a vector y.

X corresponds to the feature extracted based on domain knowledge. Y is a category of classification. In the process of training, only the correct category in y is 1, while the others are 0. A group (x, y) is called a sample. The training process requires thousands of samples. The backpropagation algorithms (a very general algorithm) is used to update the weights until finally the training of all samples are completed.

After the model training is completed, the features extracted from the input data are used for the unknown input data. Then, the probability of the output node is calculated on the weights that have been trained already, where the sum of probability values of all output nodes equals to 1. The probability is the probability that the corresponding set of unknown input data is in the category, which may be conceived as the degree with which the input data is similar to the category.

In example embodiments of the present disclosure, when determining whether a certain frame of the continuous speech signal is speech or non-speech, first, a large number of speech signals and non-speech signals prepared in advance are used to train a neural network model. The model only has two output nodes, i.e., speech and non-speech respectively. For each frame of the continuous speech signal, the model will calculate the output probabilities of the two nodes.

Finally, based on the probability of the frame to be similar to the speech signal and the probability of the frame to be similar to the non-speech signal, whether each frame of the continuous speech signal is speech is determined. For example, if the probability of the frame similar to the speech signal is higher than the probability of the frame to be similar to the non-speech signal, the current frame is deemed to be a speech signal. Otherwise, the current frame is deemed to be a non-speech signal. For another example, if the probability of the frame to be similar to the speech signal is greater than the preset threshold, the frame is deemed to be a speech signal. Otherwise, the frame is deemed to be a non-speech signal.

The continuous speech signal is streamed. For each frame, the output probability of the node needs to be calculated. When the speech input is completed, whether each frame of the continuous speech signal is speech or non-speech may be known.

In practice, it is possible to decide which neural network model to choose based on experimental results. For example, a fully connected network model (also known as a deep confidence network model) or a recurrent neural network may be chosen.

At block 410, according to the determination result of each frame of the continuous speech signal and the corresponding directivity flag signal, each frame of the continuous speech signal is set to be the speech signal or a non-speech signal.

In example embodiments of the present disclosure, the directivity flag signal indicates that there is a speech signal or a non-speech signal at the time of each frame.

In an example, the block 410 may be as follows. If the determination result of the current frame of the continuous speech signal is the speech signal, and the corresponding directivity flag signal indicating that there is the speech signal at the time of the current frame, the current frame of the continuous speech signal is set to be the speech signal.

That is, when two conditions are satisfied at the same time, i.e., the current frame of the continuous speech signal determined as the speech signal, and the corresponding directivity flag signal indicating that there is a speech signal for the time of the current frame, the current frame of the continuous speech signal is set to be the speech signal.

For example, for a continuous speech signal with a duration of 4 s, 1 s-2 s, 3 s-4 s is determined as the speech signal, and other time durations are non-speech signals. For the directivity flag signal, only a period of 3 s-4 s indicates that there is a speech signal. Then, only the continuous speech signal with a duration of 3 s-4 s is set to be the speech signal.

In another example, the block 410 may be as follows. If the determination result of the current frame of the continuous speech signal is the speech signal, or the corresponding directivity flag signal indicating that there is the speech signal at the time of the current frame, the current frame of the continuous speech signal is set to be the speech signal.

That is, as long as the current frame of the continuous speech signal is determined as the speech signal, or the corresponding directivity flag signal indicating that there is the speech signal at the time of the current frame, the current frame of the continuous speech signal is set to be the speech signal.

At block 412, a duration of the non-speech segment is determined. The non-speech segment is a segment composed of each successive frame of the continuous speech signal that is set to be the non-speech signal.

For example, if the continuous speech signal is set to be a non-speech signal for each successive frame within 0.5 s, the continuous speech signal within 0.5 s is a non-speech fragment.

At block 414, each frame of the continuous speech signal in the non-speech segment of which the duration is less than the first preset threshold is set to be the speech signal.

For example, if the first preset threshold is 0.6 s, and the duration of the non-speech segment is 0.5 s, each frame of the continuous speech signal in the non-speech segment is set to be the speech signal. The first preset threshold may be adjusted based on actual situation.

Block 412 and block 414 belong to a smoothing method for setting a non-speech segment with a short duration to be speech. The purpose is to ignore the relatively short pause in human speech and treat the relatively short pause as the speech signal. In example embodiments of the present disclosure, block 412 and block 414 are exemplary.

At block 416, the signal in each frame of the continuous speech signal that is set to be the speech signal is determined as the speech activation detection signal.

The speech activation detection signal is the final determined audio signal for the sound source direction. The speech recognition may be performed on the speech activation detection signal. Finally, the corresponding operation may be performed according to the recognition result, for example, playing music, answering a call, etc.

In order to enable those skilled in the art to better understand embodiments of the present disclosure, hereinafter, an example is set to explain example embodiments of the present disclosure.

Figure 6:
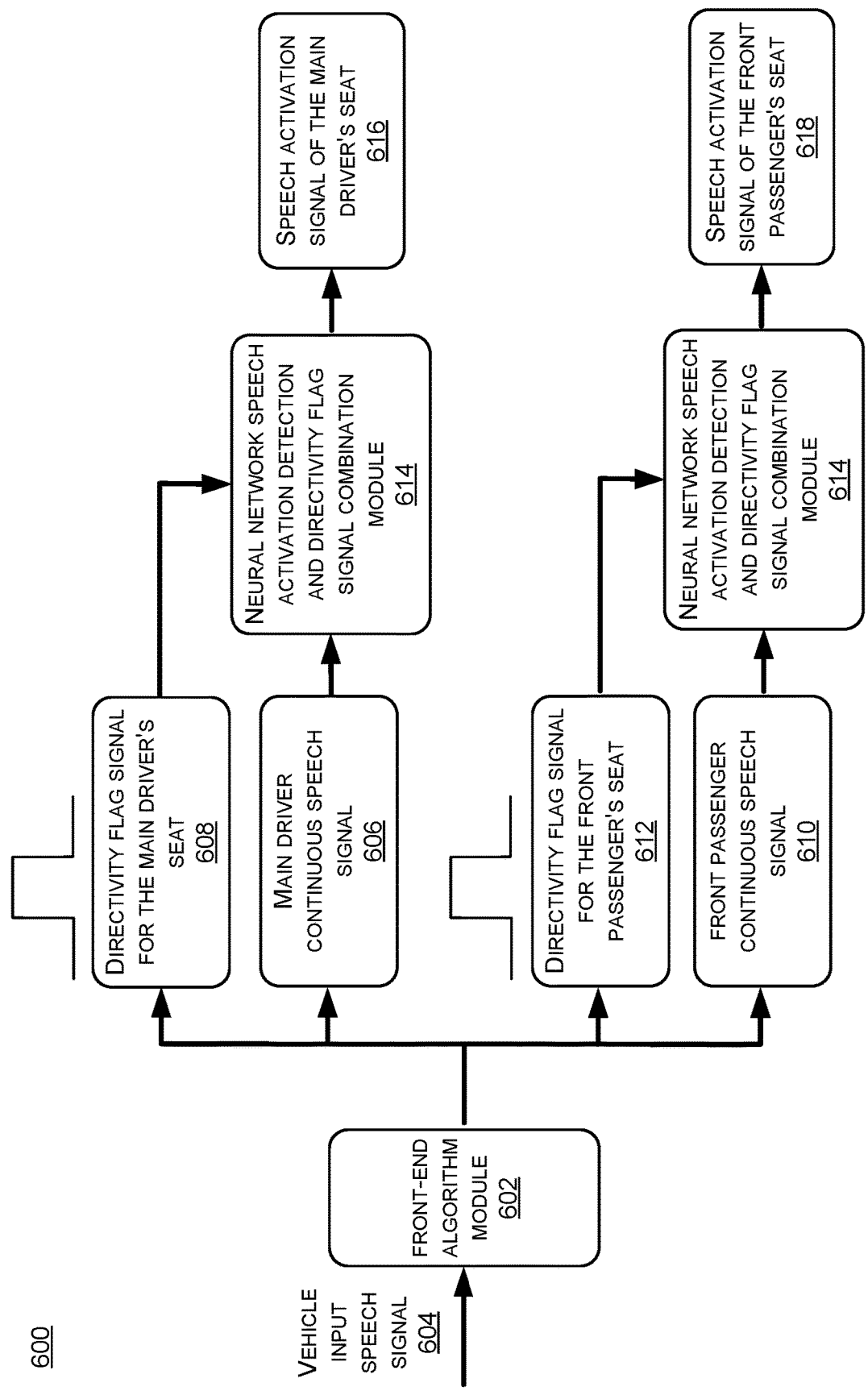
FIG. 6 is a schematic diagram of recognizing speeches from the main driver's seat and the front passenger's seat in the embodiments.

Referring to FIG. 6, a schematic diagram of an apparatus 600 for recognizing speeches from the main driver's seat and the front passenger's seat in the embodiments of the present disclosure is shown.

A front-end algorithm module 602 receives a vehicle input speech signal 604. The vehicle input speech signal 604 includes four signals collected by two microphones, which respectively are the continuous speech signal from the main driver's seat and the audio signal played by the in-vehicle device collected by the first microphone, the continuous speech signal from the front passenger's seat and the audio signal played by the in-vehicle device collected by the second microphone.

The front-end algorithm module 602 performs signal processing on the four signals, while separating the main driver continuous speech signal 606 and the directivity flag signal 608 for the main driver's seat, and the front passenger continuous speech signal 610 and the directivity flag signal 612 for the front passenger's seat.

The directivity flag signal 608 for the main driver's seat indicates whether there is a speech in the direction of the main driver's seat at the time point. The directivity flag signal 608 has two values, i.e., 0 and 1. 0 indicates that there is no speech at the main driver's seat at the time point. 1 indicates that there is a speech at the main driver's seat at the time point.

The directivity flag signal 612 for the front passenger's seat indicates whether there is a speech in the direction of the front passenger's seat at the time point. The directivity flag signal 612 has two values i.e., 0 and 1. 0 indicates that there is no speech at the front passenger's seat at the time point. 1 indicates that there is a speech at the front passenger's seat at the time point.

A neural network speech activation detection and directivity flag signal combination module 614 determines whether a frame of the continuous speech signal is a speech using a neural network model. Then, an AND operation is performed on the determination result with the directivity flag signal of the time point.

That is, when the neural network module 614 determines that there is a speech, and the directivity flag signal at the time point is 1 at the same time, the frame of the signal is determined as a speech. Otherwise, the frame will be determined as a non-speech. After the frame-by-frame determination is completed, the neural network module 614 then performs a smoothing process to force the non-speech segment with a short intermediate time (less than a preset threshold, such as 0.5 s) to be a speech.

The neural network module 614 finally outputs the speech activation detection signal 616 of the main driver's seat and the speech activation detection signal 618 of the front passenger's seat. For example, for a certain continuous input signal with a duration of 4 s, is to 2 s, 3 s to 4 s are speech segments, while other time durations are muted. However, the directivity flag signal is 1 only from 3 s to 4 s. After being processed by the module, the signal of 3 s to 4 s is directly output as the result of the speech activation detection.

Figure 7A:
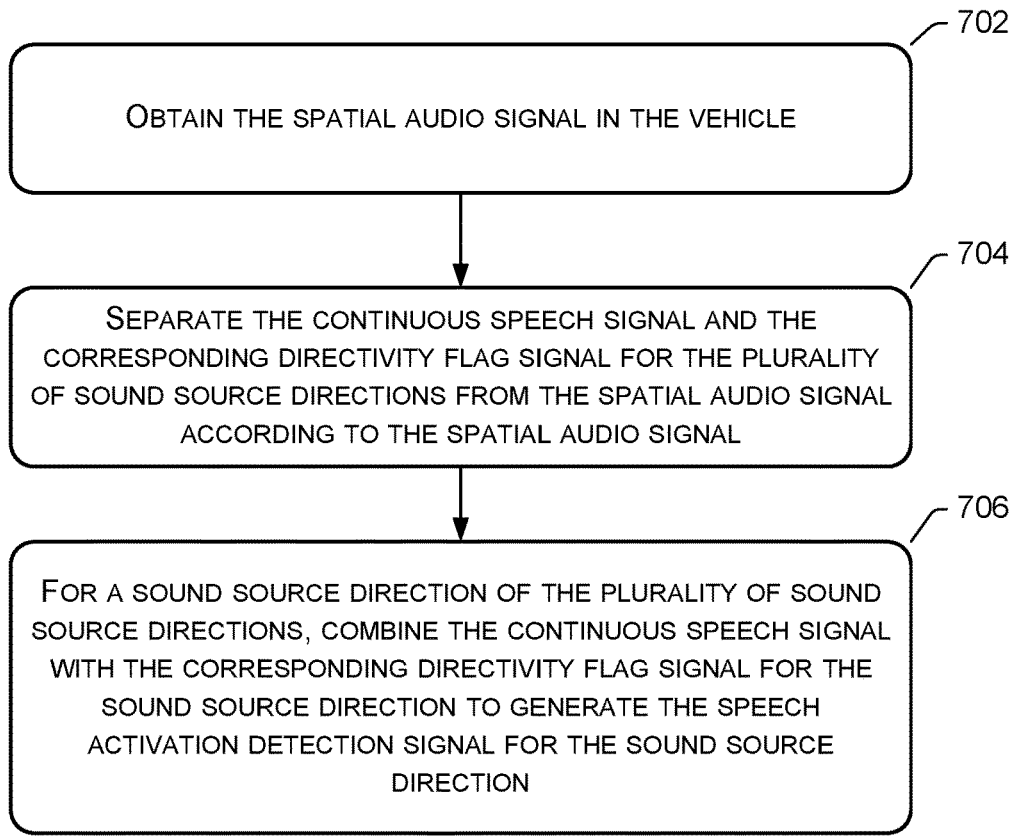
FIG. 7A is a flowchart of Embodiment 4 of a speech signal recognition method of the present disclosure.

Referring to FIG. 7A, a flowchart of Embodiment 4 of a speech signal recognition method of the present disclosure is shown, which may include the following.

At block 702, the spatial audio signal in the vehicle is obtained.

In embodiments of the application, the in-vehicle terminal may collect the spatial audio signal inside the vehicle through the microphone array set in the vehicle. The in-vehicle terminal performs the speech signal recognition on the spatial audio signal in the vehicle.

At block 704, the continuous speech signal and the corresponding directivity flag signal for the plurality of sound source directions are separated from the spatial audio signal according to the spatial audio signal.

The in-vehicle terminal may separate a continuous speech signal and a corresponding directivity flag signal for a plurality of sound source directions from the spatial audio signal.

Figure 7B:
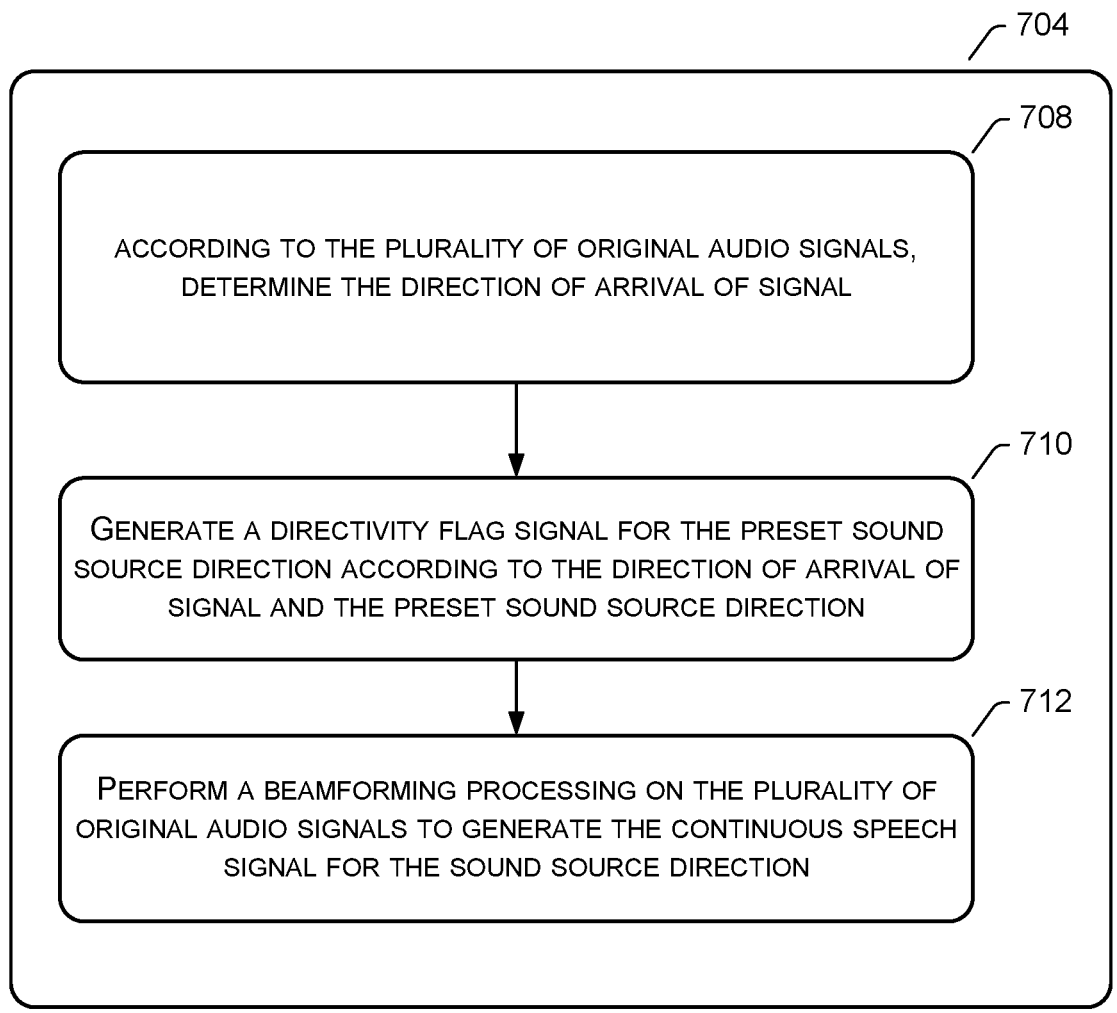
FIG. 7B is a flowchart showing details of block 704 in FIG. 7A.

FIG. 7B is a flowchart showing details of block 704 in FIG. 7A. In example embodiments of the present disclosure, the spatial audio signal includes a plurality of original audio signals collected by a plurality of microphones. The block 704 may include the following.

At block 708, according to the plurality of original audio signals, the signal arrival direction is estimated.

At block 710, a directivity flag signal for the preset sound source direction is generated according to the signal arrival direction and the preset sound source direction.

At block 712, a beamforming processing is performed on the plurality of original audio signals to generate the continuous speech signal for the sound source direction.

In example embodiments of the present disclosure, block 712 may include the following.

The delay difference between every two signals in the plurality of original audio signals is determined. The delay compensation is performed on the plurality of original audio signals according to the delay difference between every two signals. A weighted summation is performed on the plurality of original audio signals after the delay compensation to generate the continuous speech signal for the sound source direction.

At block 706, for a sound source direction of the plurality of sound source directions, the continuous speech signal is combined with the corresponding directivity flag signal for the sound source direction to generate the speech activation detection signal for the sound source direction.

The in-vehicle terminal may combine the continuous speech signal and the corresponding directivity flag signal to generate the speech activation detection signal for the corresponding sound source direction.

Figure 7C:
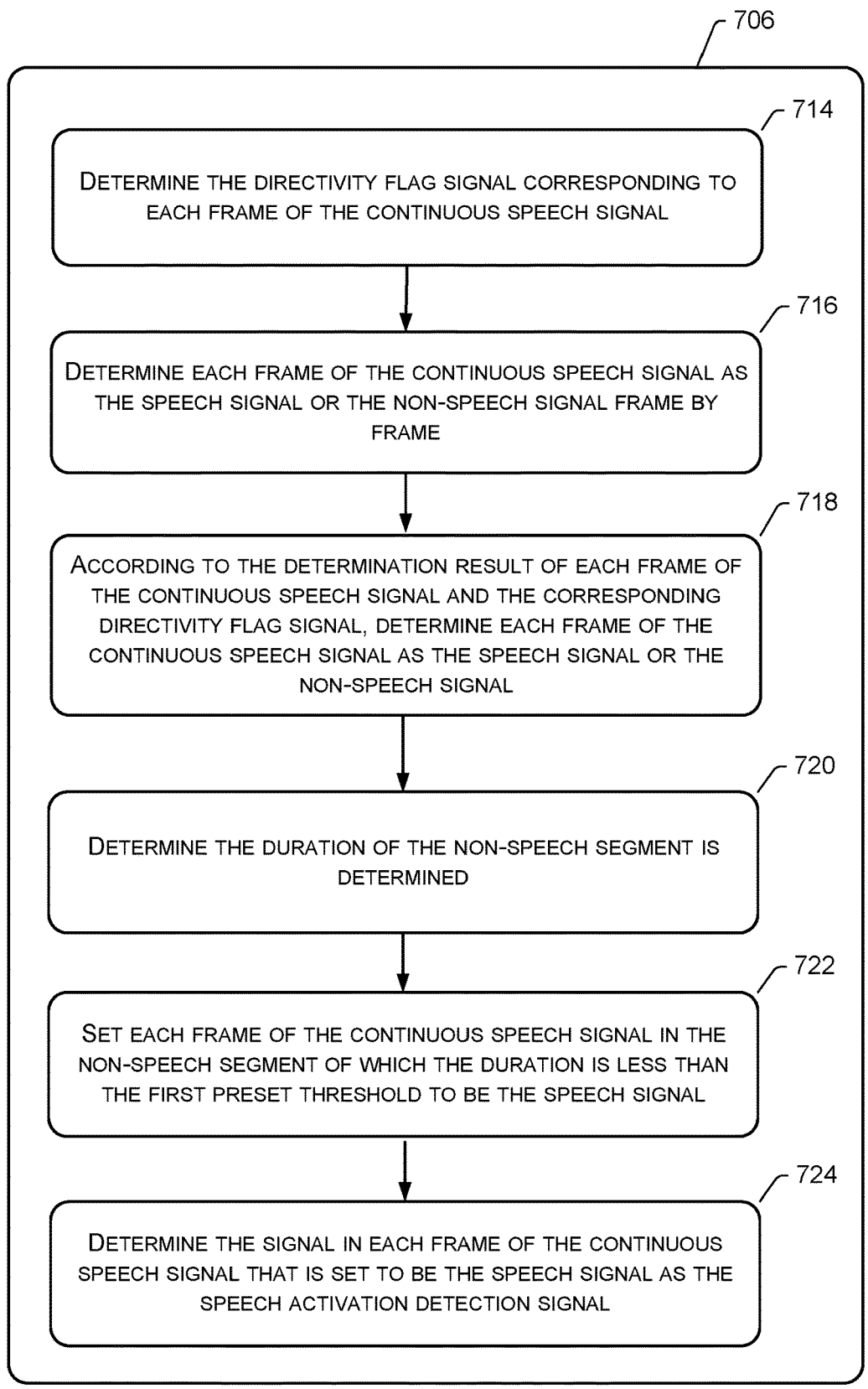
FIG. 7C is a flowchart showing details of block 706 in FIG. 7A.

FIG. 7C is a flowchart showing details of block 706 in FIG. 7A. In example embodiments of the present disclosure, block 706 may include the following.

At block 714, the directivity flag signal corresponding to each frame of the continuous speech signal is determined.

In example embodiments of the present disclosure, prior to block 714, the following may be further included.

The duration of the non-speech indication segment is determined. The non-speech indication segment is composed of the continuous directivity flag signal indicating that there is the non-speech signal at the time of the current frame. The directivity flag signal of each frame of the non-speech indication segment having a duration less than a second preset threshold is set to indicate that there is the speech signal at the time of the current frame.

At block 716, each frame of the continuous speech signal is determined as the speech signal or the non-speech signal frame by frame.

In example embodiments of the present disclosure, block 716 may further include the following.

The continuous speech signal is input into a preset neural network model. Each frame of the continuous speech signal is determined as the speech signal or the non-speech signal frame by frame.

At block 718, according to the determination result of each frame of the continuous speech signal and the corresponding directivity flag signal, each frame of the continuous speech signal is determined as the speech signal or the non-speech signal.

The directivity flag signal indicates that there is the speech signal or the non-speech signal at the time of each frame.

In an example of embodiments of the present disclosure, block 718 may include the following. If the determination result of the current frame of the continuous speech signal is the speech signal, and the corresponding directivity flag signal indicates that there is the speech signal at the time of the current frame, the current frame of the continuous speech signal is set to be the speech signal.

In another example of embodiments of the present disclosure, block 718 may include the following.

If the determination result of the current frame of the continuous speech signal is the speech signal, or the corresponding directivity flag signal indicates that there is the speech signal at the time of the current frame, the current frame of the continuous speech signal is set to be the speech signal.

At block 720, the duration of the non-speech segment is determined. The non-speech segment is a segment composed of each successive frame of the continuous speech signal that is set to be the non-speech signal.

At block 722, each frame of the continuous speech signal in the non-speech segment of which the duration is less than the first preset threshold is set to be the speech signal.

At block 724, the signal in each frame of the continuous speech signal that is set to be the speech signal is determined as the speech activation detection signal.

Figure 8A:
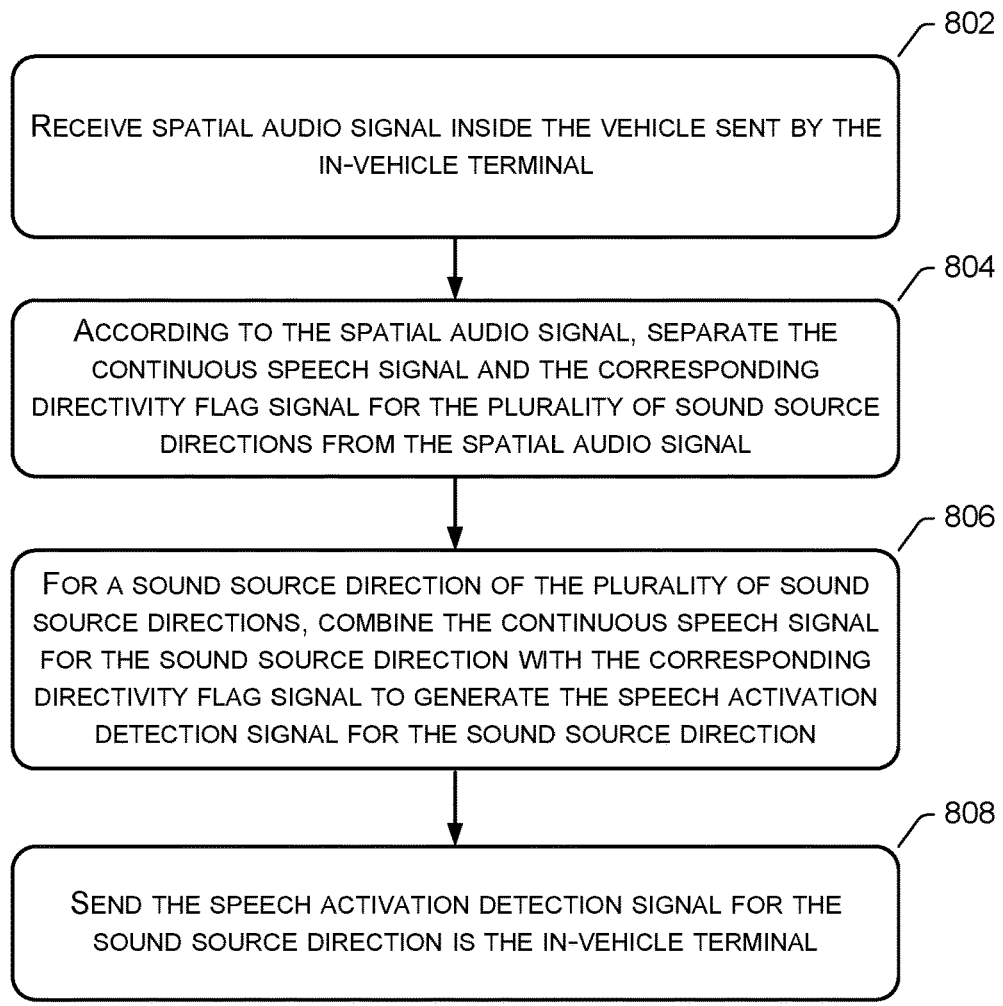
FIG. 8A is a flowchart of Embodiment 5 of a speech signal recognition method of the present disclosure.

Referring to FIG. 8A, a flowchart of Embodiment 5 of the speech signal recognition method of the present disclosure is shown, which may include the following.

At block 802, spatial audio signal inside the vehicle sent by the in-vehicle terminal is received.

In example embodiments of the present disclosure, an audio collecting device (such as a microphone) is placed inside the vehicle to collect the spatial audio signal inside the vehicle.

The in-vehicle terminal communicates with the cloud server. The in-vehicle terminal sends the spatial audio signal inside the vehicle to the cloud server. The speech signal recognition is performed by the cloud server.

At block 804, according to the spatial audio signal, the continuous speech signal and the corresponding directivity flag signal for the plurality of sound source directions are separated from the spatial audio signal.

The cloud server separates continuous speech signals for a plurality of sound source directions and corresponding directivity flag signals from the spatial audio signal.

In example embodiments of the present disclosure, the spatial audio signal includes a plurality of original audio signals collected by a plurality of microphones.

Figure 8B:
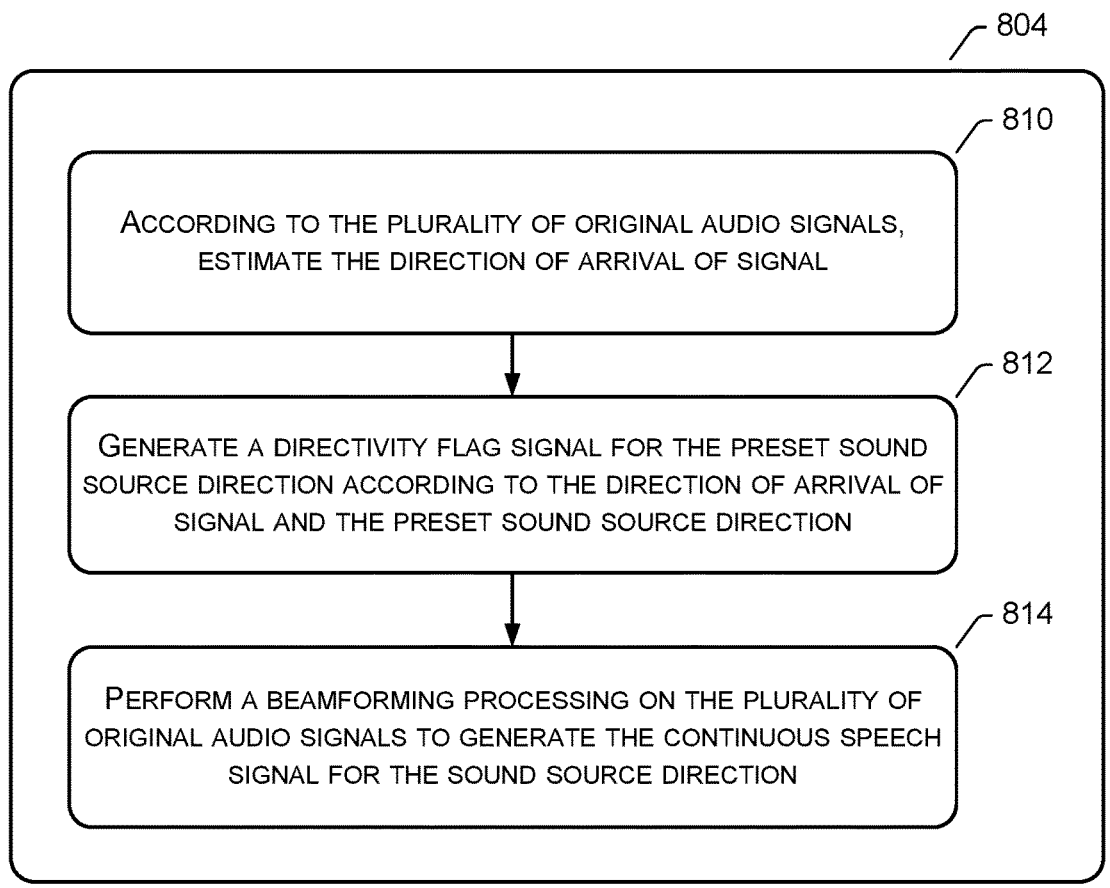
FIG. 8B is a flowchart showing details of block 804 in FIG. 8A.

FIG. 8B is a flowchart showing details of block 804 in FIG. 8A. Block 804 may include the following.

At block 810, according to the plurality of original audio signals, the signal arrival direction is estimated.

At block 812, a directivity flag signal for the preset sound source direction is generated according to the signal arrival direction and the preset sound source direction.

At block 814, a beamforming processing is performed on the plurality of original audio signals to generate the continuous speech signal for the sound source direction.

In example embodiments of the present disclosure, block 814 may include the following.

The delay difference between every two signals in the plurality of original audio signals is determined. The delay compensation is performed on the plurality of original audio signals according to the delay difference between every two signals. A weighted summation is performed on the plurality of original audio signals after the delay compensation to generate the continuous speech signal for the sound source direction.

At block 806, for a sound source direction of the plurality of sound source directions, the continuous speech signal for the sound source direction is combined with the corresponding directivity flag signal to generate the speech activation detection signal for the sound source direction.

The cloud server generates the speech activation detection signal for the corresponding sound source direction according to the continuous speech signal and the corresponding directivity flag signal.

Figure 8C:
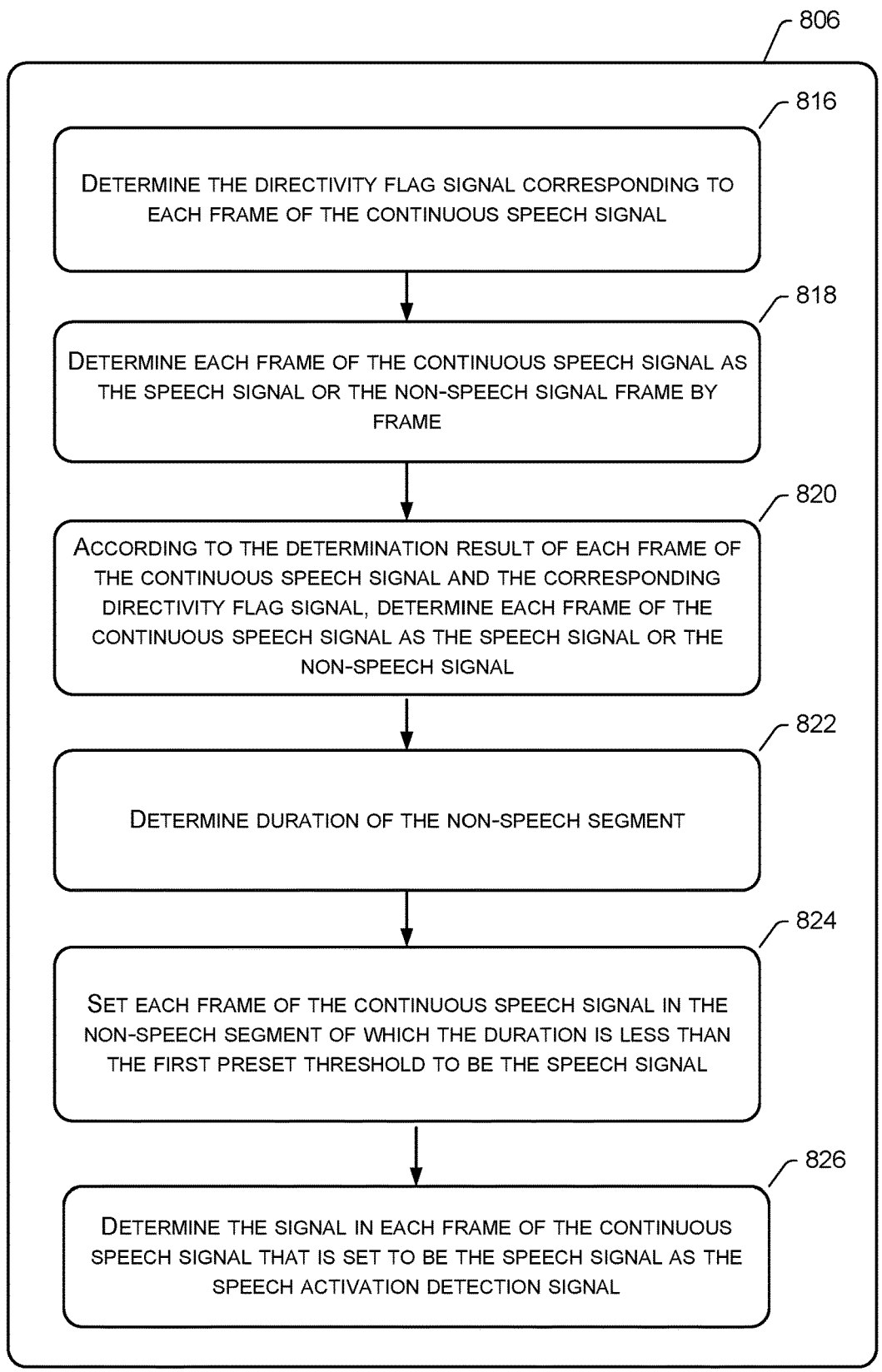
FIG. 8C is a flowchart showing details of block 806 in FIG. 8A.

FIG. 8C is a flowchart showing details of block 806 in FIG. 7A. In example embodiments of the present disclosure, block 806 may include the following.

At block 816, the directivity flag signal corresponding to each frame of the continuous speech signal is determined.

In example embodiments of the present disclosure, prior to block 816, the following may be included.

The duration of the non-speech indication segment is determined. The non-speech indication segment is composed of the continuous directivity flag signal indicating that there is the non-speech signal at the time of the current frame. The directivity flag signal of each frame of the non-speech indication segment having a duration less than a second preset threshold is set to indicate that there is the speech signal at the time of the current frame.

At block 818, each frame of the continuous speech signal is determined as the speech signal or the non-speech signal frame by frame.

In example embodiments of the present disclosure, block 818 may further include the following.

The continuous speech signal is input into a preset neural network model. Each frame of the continuous speech signal is determined as the speech signal or the non-speech signal frame by frame.

At block 820, according to the determination result of each frame of the continuous speech signal and the corresponding directivity flag signal, each frame of the continuous speech signal is determined as the speech signal or the non-speech signal.

The directivity flag signal indicates that there is the speech signal or the non-speech signal at the time of each frame.

In an example of embodiments of the present disclosure, block 820 may include the following. If the determination result of the current frame of the continuous speech signal is the speech signal, and the corresponding directivity flag signal indicates that there is the speech signal at the time of the current frame, the current frame of the continuous speech signal is set to be the speech signal.

In another example of embodiments of the present disclosure, block 820 may include the following.

If the determination result of the current frame of the continuous speech signal is the speech signal, or the corresponding directivity flag signal indicates that there is the speech signal at the time of the current frame, the current frame of the continuous speech signal is set to be the speech signal.

At block 822, the duration of the non-speech segment is determined. The non-speech segment is a segment composed of each successive frame of the continuous speech signal that is set to be the non-speech signal.

At block 824, each frame of the continuous speech signal in the non-speech segment of which the duration is less than the first preset threshold is set to be the speech signal.

At block 826, the signal in each frame of the continuous speech signal that is set to be the speech signal is determined as the speech activation detection signal.

At block 808, the speech activation detection signal for the sound source direction is sent to the in-vehicle terminal.

The cloud server sends the recognized speech activation detection signal for the corresponding sound source direction to the in-vehicle terminal. The in-vehicle terminal may perform speech recognition according to the speech activation detection signal, and finally perform corresponding operations according to the recognition result, for example, playing music, answering a call, etc.

In order to enable those skilled in the art to better understand embodiments of the present disclosure, hereinafter, an example is set to explain example embodiments of the present disclosure.

Figure 9:
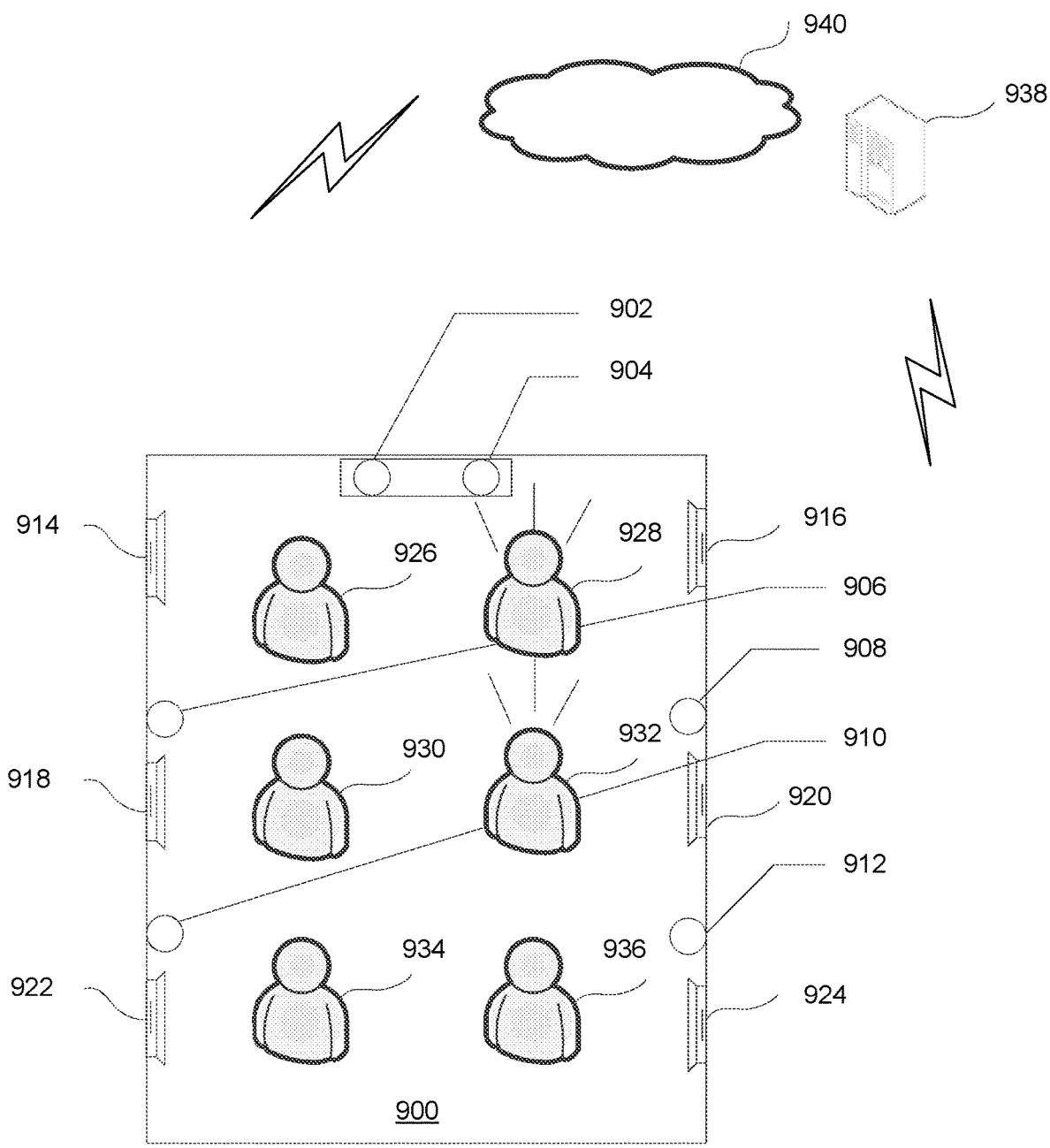
FIG. 9 is a schematic diagram of recognizing in-vehicle speech by a cloud server in example embodiments of the present disclosure.

Referring to FIG. 9, a schematic diagram of recognizing in-vehicle speech by a cloud server in example embodiments of the present disclosure is shown.

The vehicle 900 is provided with a first microphone 902, a second microphone 904, a third microphone 906, a fourth microphone 908, a fifth microphone 910, and a sixth microphone 912.

The vehicle is provided with a first speaker 914, a second speaker 916, a third speaker 918, a fourth speaker 920, a fifth speaker 922, and a sixth speaker 924.

The vehicle has the first passenger 926, a second passenger 928, a third passenger 930, a fourth passenger 932, a fifth passenger 934, and a sixth passenger 936.

The first microphone 902 is configured to collect the audio played by the first speaker 914 and the speech of the first passenger 926. The second microphone 904 is used to collect the audio played by the second speaker 916 and the speech of the second passenger 928. The third microphone 906 is used to collect the audio played by the third microphone 906 and the speech of the third passenger 930. The fourth microphone 908 is used to collect the audio played by the fourth speaker 920 and the speech of the fourth passenger 932. The fifth microphone 910 is used to collect the audio played by the fifth speaker 922 and the speech of the fifth passenger 934. The sixth microphone 912 is used to collect the audio played by the sixth of the speaker 924 and the speech of the sixth passenger 936.

The audio collected by each microphone may be uploaded to the cloud server 938 via the network 940.

The cloud server 938 may separate the continuous speech signal from each passenger and the corresponding directivity flag signal from the speech of the passenger and the audio played by the speaker collected by each microphone, and according to the continuous speech signal of each passenger and the corresponding directivity flag signal, generate the speech activation detection signal for the corresponding passenger.

Figure 10A:
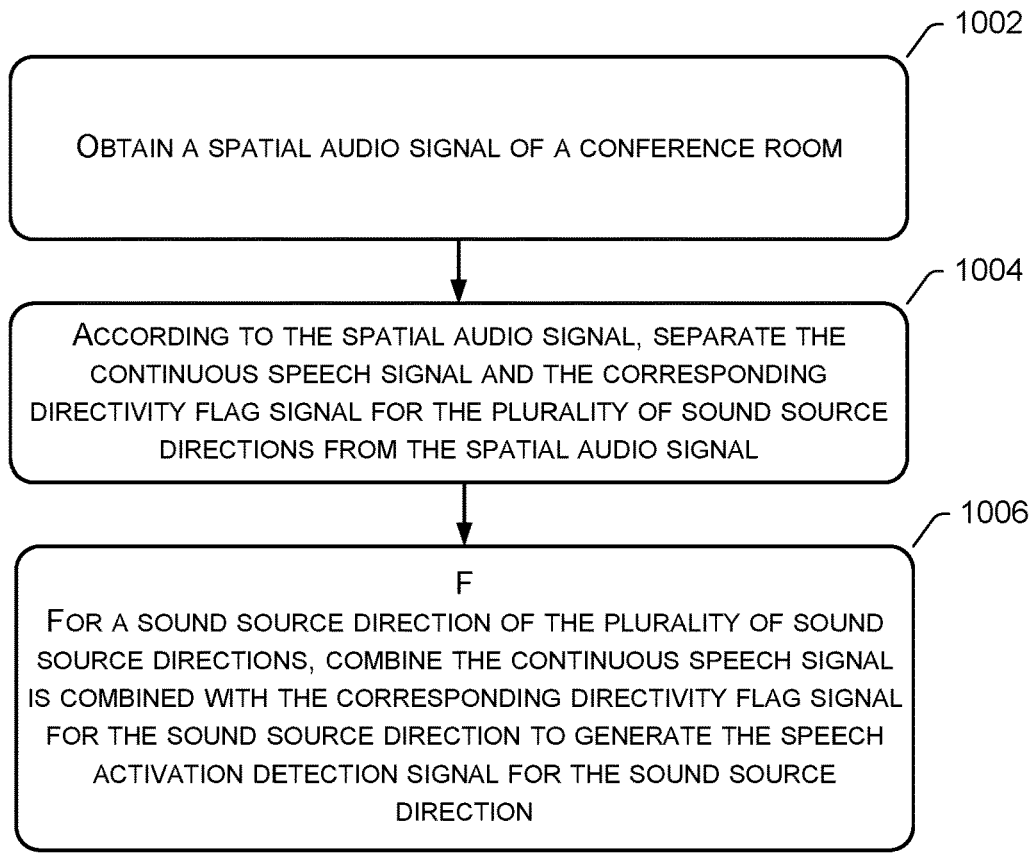
FIG. 10A is a flowchart of Embodiment 6 of a speech signal recognition method of the present disclosure.

Referring to FIG. 10A, a flowchart of Embodiment 6 of a speech signal recognition method of the present disclosure is shown, which may include the following.

At block 1002, a spatial audio signal of a conference room is obtained.

in embodiments of the application, a microphone may be set in each seat of the conference room. The space audio signal inside the conference room is collected by the microphones. Then, a recognition terminal of the conference room performs speech signal recognition on the spatial recognition signal inside the conference room.

At block 1004, according to the spatial audio signal, the continuous speech signal and the corresponding directivity flag signal for the plurality of sound source directions are separated from the spatial audio signal.

The recognition terminal of the conference room may separate the continuous speech signal for a plurality of sound source directions and the corresponding directivity flag signal from the spatial audio signal.

In example embodiments of the present disclosure, the spatial audio signal includes a plurality of original audio signals collected by a plurality of microphones. Block 1004 may include the following.

At block 1008, according to the plurality of original audio signals, the signal arrival direction is estimated.

At block 1010, a directivity flag signal for the preset sound source direction is generated according to the signal arrival direction and the preset sound source direction.

At block 1012, a beamforming processing is performed on the plurality of original audio signals to generate the continuous speech signal for the sound source direction.

Figure 10B:
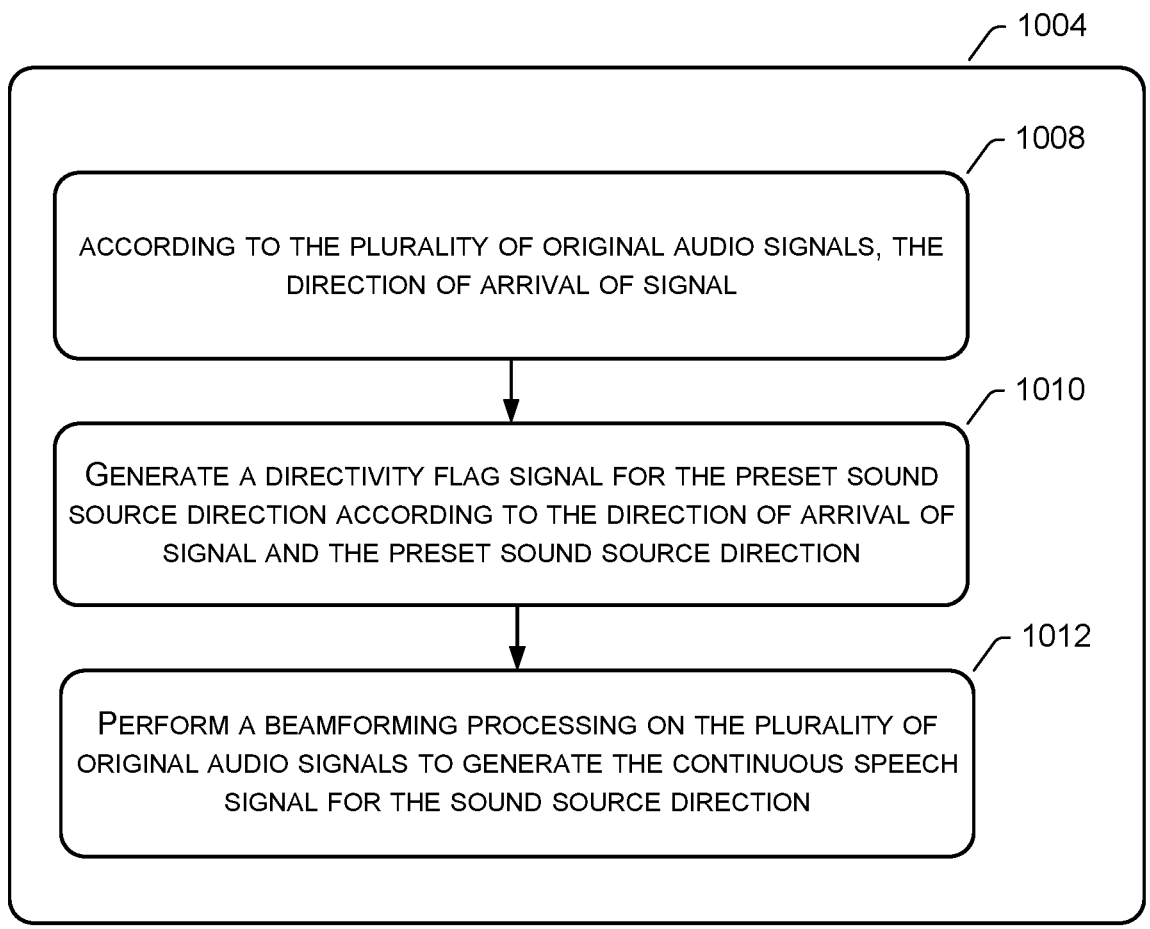
FIG. 10B is a flowchart showing details of block 1004 in FIG. 10A.
Figure 10C:
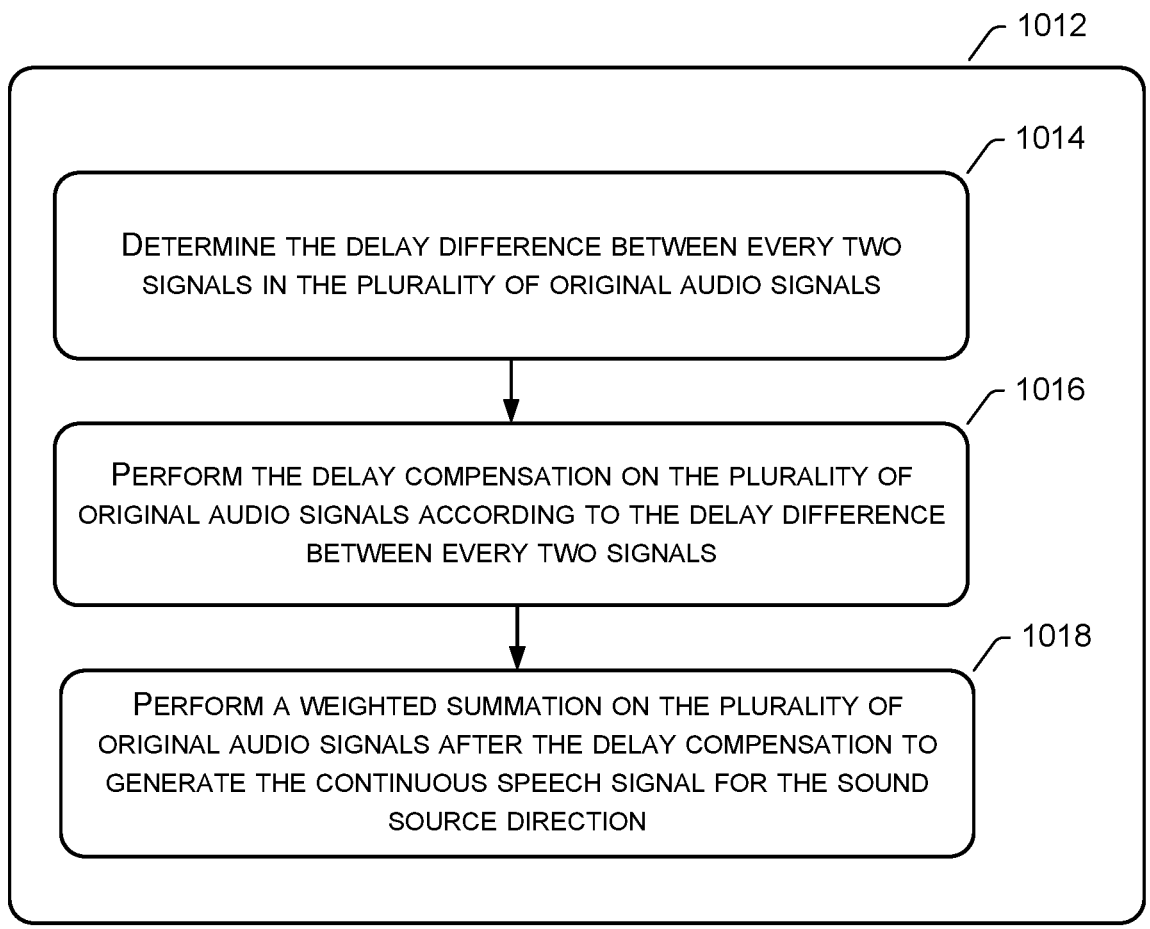
FIG. 10C is a flowchart showing details of block 1012 in FIG. 10B.

FIG. 10C is a flowchart showing details of block 1012 in FIG. 10B. In example embodiments of the present disclosure, block 1012 may include the following.

At block 1014, the delay difference between every two signals in the plurality of original audio signals is determined. At block 1016, the delay compensation is performed on the plurality of original audio signals according to the delay difference between every two signals. At block 1018, a weighted summation is performed on the plurality of original audio signals after the delay compensation to generate the continuous speech signal for the sound source direction.

At block 1006, for a sound source direction of the plurality of sound source directions, the continuous speech signal is combined with the corresponding directivity flag signal for the sound source direction to generate the speech activation detection signal for the sound source direction.

The recognition terminal of the conference room can combine the continuous speech signal and the corresponding directivity flag signal to generate the speech activation detection signal for the corresponding sound source direction.

Figure 10D:
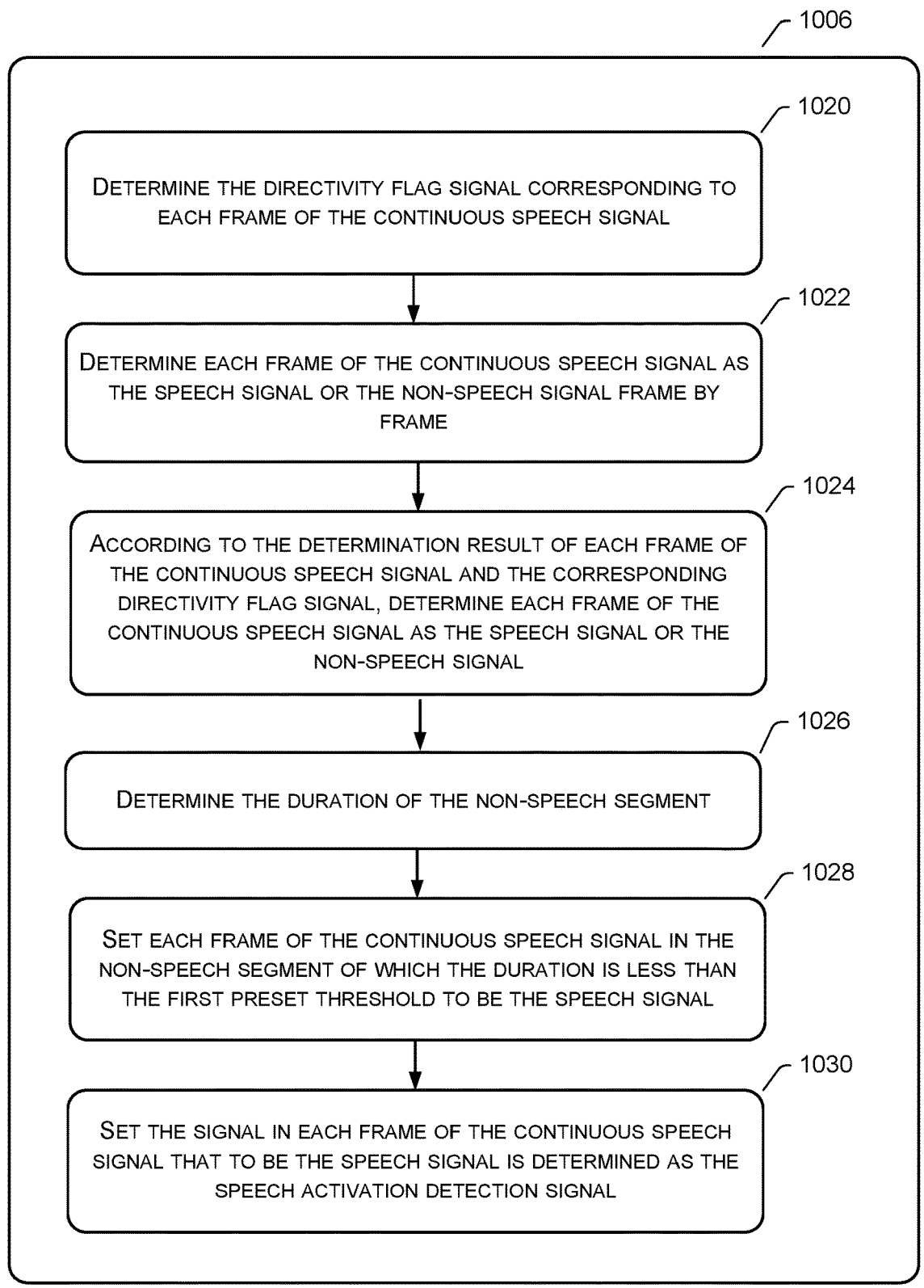
FIG. 10D is a flowchart showing details of block 1006 in FIG. 10A.

FIG. 10D is a flowchart showing details of block 1006 in FIG. 10A. In example embodiments of the present disclosure, block 1006 may include the following.

At block 1020, the directivity flag signal corresponding to each frame of the continuous speech signal is determined.

In example embodiments of the present disclosure, prior to the block 1020, the following may be further included.

The duration of the non-speech indication segment is determined. The non-speech indication segment is composed of the continuous directivity flag signal indicating that there is the non-speech signal at the time of the current frame. The directivity flag signal of each frame of the non-speech indication segment having a duration less than a second preset threshold is set to indicate that there is the speech signal at the time of the current frame.

At block 1022, each frame of the continuous speech signal is determined as the speech signal or the non-speech signal frame by frame.

In example embodiments of the present disclosure, block 1022 may further include the following.

The continuous speech signal is input into a preset neural network model. Each frame of the continuous speech signal is determined as the speech signal or the non-speech signal frame by frame.

At block 1024, according to the determination result of each frame of the continuous speech signal and the corresponding directivity flag signal, each frame of the continuous speech signal is determined as the speech signal or the non-speech signal.

The directivity flag signal indicates that there is the speech signal or the non-speech signal at the time of each frame.

In an example of embodiments of the present disclosure, block 1024 may include the following. If the determination result of the current frame of the continuous speech signal is the speech signal, and the corresponding directivity flag signal indicates that there is the speech signal at the time of the current frame, the current frame of the continuous speech signal is set to be the speech signal.

In another example of embodiments of the present disclosure, block 1024 may include the following.

If the determination result of the current frame of the continuous speech signal is the speech signal, or the corresponding directivity flag signal indicates that there is the speech signal at the time of the current frame, the current frame of the continuous speech signal is set to be the speech signal.

At block 1026, the duration of the non-speech segment is determined. The non-speech segment is a segment composed of each successive frame of the continuous speech signal that is set to be the non-speech signal.

At block 1028, each frame of the continuous speech signal in the non-speech segment of which the duration is less than the first preset threshold is set to be the speech signal.

At block 1030, the signal in each frame of the continuous speech signal that is set to be the speech signal is determined as the speech activation detection signal.

It should be noted that, for the sake of simple description, method embodiments are described as a combination of a series of action. However, those skilled in the art should understand that the embodiments of the present disclosure are not limited by the sequence of actions described herein. Because according to embodiments of the present disclosure, some steps may be performed in other orders or concurrently. Secondly, those skilled in the art should also appreciate that the embodiments described in the specification are example embodiments, where the actions involved may be optional for the embodiments of the present disclosure.

Figure 11:
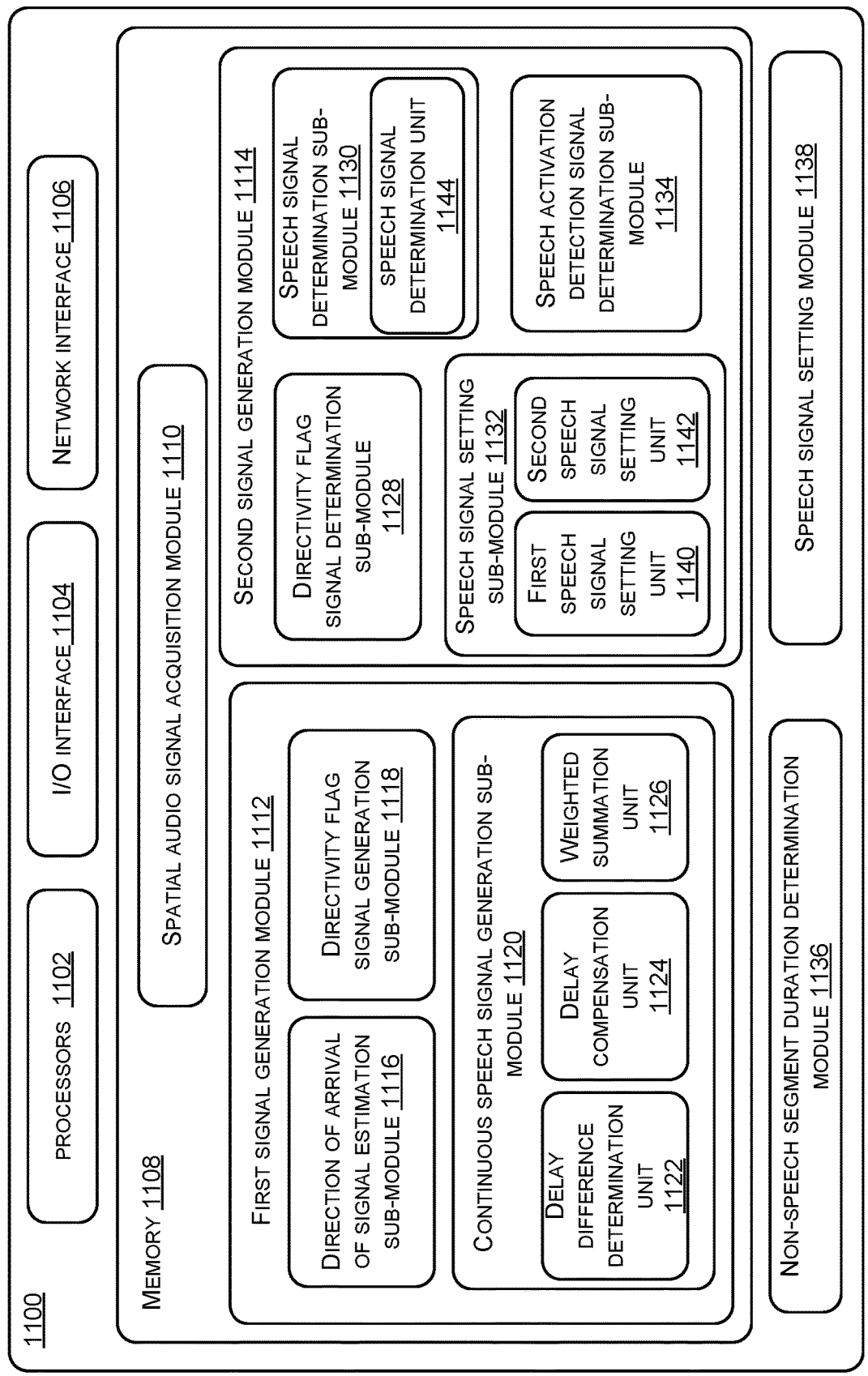
FIG. 11 is a structural block diagram of Embodiment 1 of a speech signal recognition device of the present disclosure.

Referring to FIG. 11, a block diagram shows a structure of a speech signal recognition device 1100 of the present disclosure. The speech signal recognition device 1100 may include may include one or more processors 1102, an input/output (I/O) interface 1104, a network interface 1106, and memory 1108. The memory 1108 may include the following modules.

A spatial audio signal acquisition module 1110 is configured to obtain spatial audio signal in the designated space.

A first signal generation module 1112 is configured to, according to the spatial audio signal, separate a continuous speech signal and a corresponding directivity flag signal for a plurality of sound source directions from the spatial audio signal.

A second signal generation module 1114 is configured to combine the continuous speech signal for the sound source direction and the corresponding directivity flag signal for the sound source direction of the plurality of sound source directions to generate the speech activation detection signal for the sound source direction In example embodiments of the present disclosure, the spatial audio signal includes a plurality of original audio signals collected by a plurality of microphones. The first signal generation module 1112 may include the following.

A direction of arrival of signal estimation sub-module 1116 is configured to, according to the plurality of original audio signals, estimate the signal arrival direction.

A directivity flag signal generation sub-module 1118 is configured to generate a directivity flag signal for the preset sound source direction according to the signal arrival direction and the preset sound source direction.

A continuous speech signal generation sub-module 1120 is configured to perform a beamforming processing on the plurality of original audio signals to generate the continuous speech signal for the sound source direction.

In example embodiments of the present disclosure, the continuous speech signal generation sub-module 1120 includes the following.

A delay difference determination unit 1122 is configured to determine the delay difference between every two signals in the plurality of original audio signals.

A delay compensation unit 1124 is configured to perform the delay compensation on the plurality of original audio signals according to the delay difference between every two signals.

A weighted summation unit 1126 is configured to, after the delay compensation, perform a weighted summation on the plurality of original audio signals to generate the continuous speech signal for the sound source direction.

In example embodiments of the present disclosure, the second signal generation module 1114 may include the following.

A directivity flag signal determination sub-module 1128 is configured to determine the directivity flag signal corresponding to each frame of the continuous speech signal.

A speech signal determination sub-module 1130 is configured to determine each frame of the continuous speech signal as the speech signal or the non-speech signal frame by frame.

A speech signal setting sub-module 1132 is configured to, according to the determination result of each frame of the continuous speech signal and the corresponding directivity flag signal, determine each frame of the continuous speech signal as the speech signal or the non-speech signal.

A speech activation detection signal determination sub-module 1134 is configured to determine the signal in each frame of the continuous speech signal that is set to be the speech signal as the speech activation detection signal.

In example embodiments of the present disclosure, the device 1100 may further include the following.

A non-speech segment duration determination module 1136 is configured to determine the duration of the non-speech segment after the speech signal setting sub-module 1132 determines each frame of the continuous speech signal as the speech signal or the non-speech signal according to the determination result of each frame of the continuous speech signal and the corresponding directivity flag signal. The non-speech segment is a segment composed of each successive frame of the continuous speech signal that is set to be the non-speech signal.

A speech signal setting module 1138 is configured to set each frame of the continuous speech signal in the non-speech segment of which the duration is less than the first preset threshold to be the speech signal.

In an example of embodiments of the present disclosure, the directivity flag signal indicates that there is the speech signal or the non-speech signal at the time of each frame. The speech signal setting sub-module 1132 may include the following.

A first speech signal setting unit 1140 is configured to set the current frame of the continuous speech signal to be the speech signal if the determination result of the current frame of the continuous speech signal is the speech signal, and the corresponding directivity flag signal indicates that there is the speech signal at the time of the current frame.

In another example of embodiments of the present disclosure, the directivity flag signal indicates that there is the speech signal or the non-speech signal at the time of each frame. The speech signal setting sub-module 1132 may include the following.

A second speech signal setting unit 1142 is configured to set the current frame of the continuous speech signal to be the speech signal if the determination result of the current frame of the continuous speech signal is the speech signal, or the corresponding directivity flag signal indicates that there is the speech signal at the time of the current frame.

In example embodiments of the present disclosure, the speech signal determination sub-module 1130 may include the following.

A speech signal determination unit 1144 is configured to input the continuous speech signal into a preset neural network model and determine each frame of the continuous speech signal as the speech signal or the non-speech signal frame by frame.

In example embodiments of the present disclosure, the device 1110 may further include the following.

A non-speech indication segment duration determination module 1136 is configured to determine the duration of the non-speech indication segment prior to the directivity flag signal determination sub-module 1128 determines the directivity flag signal corresponding to each frame of the continuous speech signal. The non-speech indication segment is composed of the continuous directivity flag signal indicating that there is the non-speech signal at the time of the current frame.

A directivity flag signal setting module 1138 is configured to set the directivity flag signal of each frame of the non-speech indication segment having a duration less than a second preset threshold to indicate that there is the speech signal at the time of the current frame.

Figure 12:
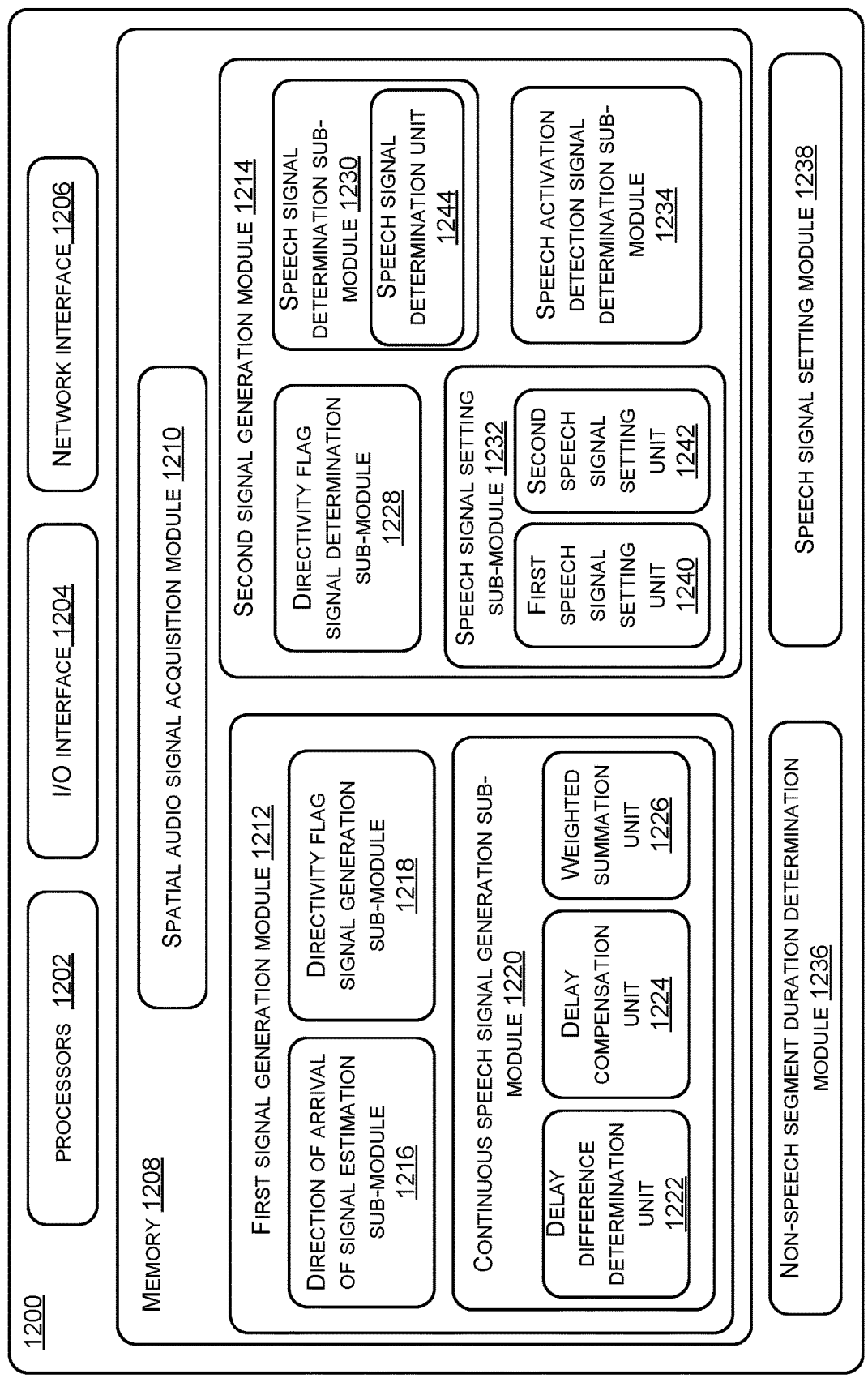
FIG. 12 is a structural block diagram of Embodiment 2 of a speech signal recognition device of the present disclosure.

Referring to FIG. 12, a structural block diagram of Embodiment 2 of a speech signal recognition device 1200 of the present disclosure is shown. The speech signal recognition device 1200 may include may include one or more processors 1202, an input/output (I/O) interface 1204, a network interface 1206, and memory 1208. The memory 1208 may include the following modules.

A spatial audio signal acquisition module 1210 is configured to obtain spatial audio signal inside the vehicle.

A first signal generation module 1212 is configured to, according to the spatial audio signal, separate a continuous speech signal and a corresponding directivity flag signal for a plurality of sound source directions from the spatial audio signal.

A second signal generation module 1214 is configured to, for a sound source direction of the plurality of sound source directions, combine the continuous speech signal with the corresponding directivity flag signal for the sound source direction to generate the speech activation detection signal for the sound source direction.

In example embodiments of the present disclosure, the spatial audio signal includes a plurality of original audio signals collected by a plurality of microphones. The first signal generation module 1212 may include the following.

A direction of arrival of signal estimation sub-module 1216 is configured to, according to the plurality of original audio signals, estimate the signal arrival direction.

A directivity flag signal generation sub-module 1218 is configured to generate the directivity flag signal for the preset sound source direction according to the signal arrival direction and the preset sound source direction.

A continuous speech signal generation sub-module 1220 is configured to perform a beamforming processing on the plurality of original audio signals to generate the continuous speech signal for the sound source direction.

In example embodiments of the present disclosure, the continuous speech signal generation sub-module 1220 may include the following.

A delay difference determination unit 1222 is configured to determine the delay difference between every two signals in the plurality of original audio signals.

A delay compensation unit 1224 is configured to perform the delay compensation on the plurality of original audio signals according to the delay difference between every two signals.

A weighted summation unit 1226 is configured to, after the delay compensation, perform a weighted summation on the plurality of original audio signals to generate the continuous speech signal for the sound source direction.

In example embodiments of the present disclosure, the second signal generation module 1214 may include the following.

A directivity flag signal determination sub-module 1228 is configured to determine the directivity flag signal corresponding to each frame of the continuous speech signal.

A speech signal determination sub-module 1230 is configured to determine each frame of the continuous speech signal as the speech signal or the non-speech signal frame by frame.

A speech signal setting sub-module 1232 is configured to, according to the determination result of each frame of the continuous speech signal and the corresponding directivity flag signal, determine each frame of the continuous speech signal as the speech signal or the non-speech signal.

A speech activation detection signal determination sub-module 1234 is configured to determine the signal in each frame of the continuous speech signal that is set to be the speech signal as the speech activation detection signal.

In example embodiments of the present disclosure, the device may further include the following.

A non-speech segment duration determination module 1236 is configured to determine the duration of the non-speech segment after the speech signal setting sub-module 1232 determines each frame of the continuous speech signal as the speech signal or the non-speech signal according to the determination result of each frame of the continuous speech signal and the corresponding directivity flag signal. The non-speech segment is a segment composed of each successive frame of the continuous speech signal that is set to be the non-speech signal.

A speech signal setting module 1238 is configured to set each frame of the continuous speech signal in the non-speech segment of which the duration is less than the first preset threshold to be the speech signal.

In an example of embodiments of the present disclosure, the directivity flag signal indicates that there is the speech signal or the non-speech signal at the time of each frame. The speech signal setting sub-module 1232 may include the following.

A first speech signal setting unit 1240 is configured to set the current frame of the continuous speech signal to be the speech signal if the determination result of the current frame of the continuous speech signal is the speech signal, and the corresponding directivity flag signal indicates that there is the speech signal at the time of the current frame.

In another example of embodiments of the present disclosure, the directivity flag signal indicates that there is the speech signal or the non-speech signal at the time of each frame. The speech signal setting sub-module 1232 may include the following.

A second speech signal setting unit 1242 is configured to set the current frame of the continuous speech signal to be the speech signal if the determination result of the current frame of the continuous speech signal is the speech signal, or the corresponding directivity flag signal indicates that there is the speech signal at the time of the current frame.

In example embodiments of the present disclosure, the speech signal determination sub-module 1230 may include the following.

A speech signal determination unit 1244 is configured to input the continuous speech signal into a preset neural network model and determine each frame of the continuous speech signal as the speech signal or the non-speech signal frame by frame.

In example embodiments of the present disclosure, the device may further include the following.

A non-speech indication segment duration determination module 1236 is configured to determine the duration of the non-speech indication segment prior to the directivity flag signal determination sub-module 1228 determines the directivity flag signal corresponding to each frame of the continuous speech signal. The non-speech indication segment is composed of the continuous directivity flag signal indicating that there is the non-speech signal at the time of the current frame.

A directivity flag signal setting module 1238 is configured to set the directivity flag signal of each frame of the non-speech indication segment having a duration less than a second preset threshold to indicate that there is the speech signal at the time of the current frame.

Figure 13:
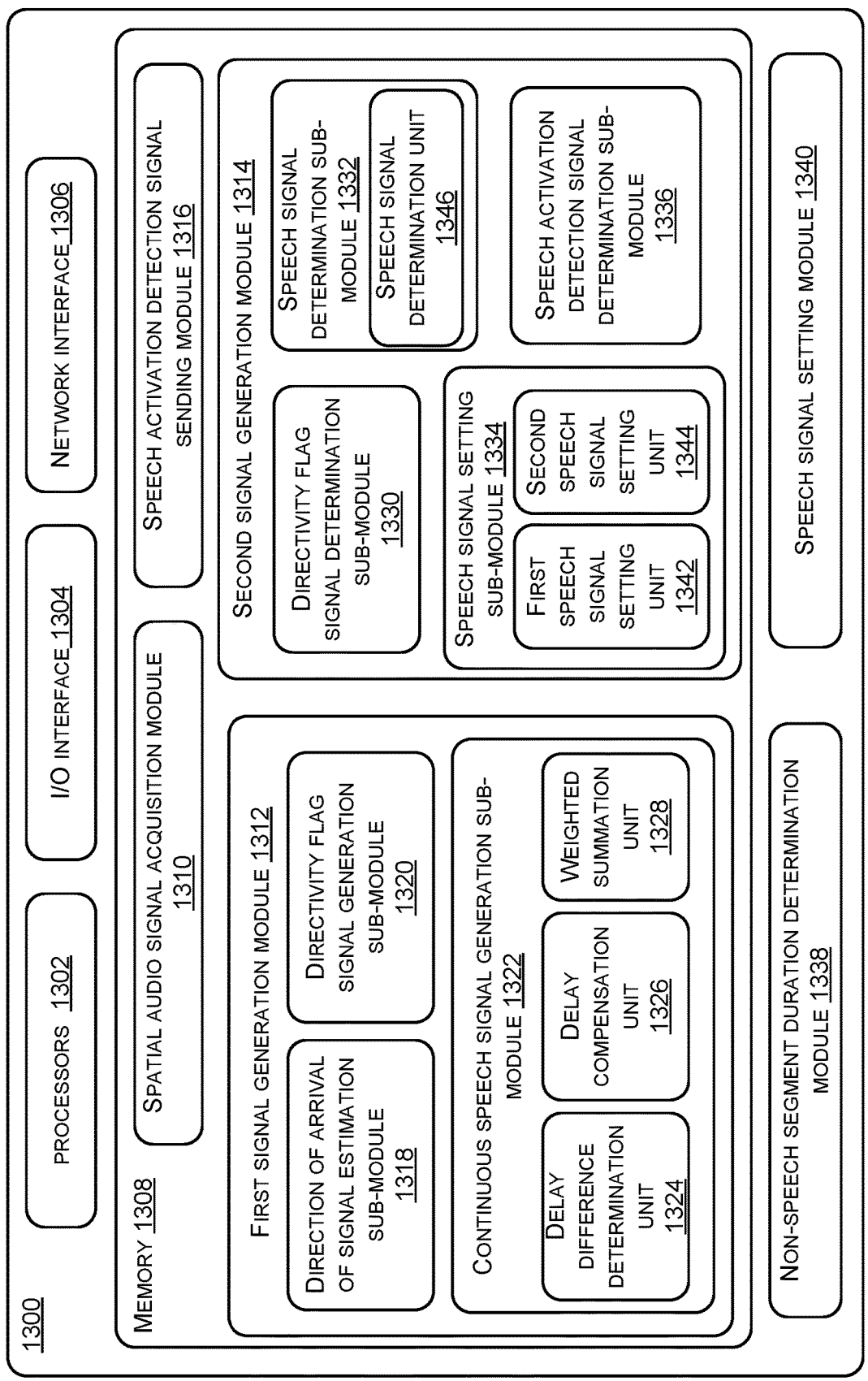
FIG. 13 is a structural block diagram of Embodiment 3 of a speech signal recognition device of the present disclosure.

Referring to FIG. 13, a structural block diagram of Embodiment 3 of a speech signal recognition device 1300 of the present disclosure is shown. The speech signal recognition device 1300 may include may include one or more processors 1302, an input/output (I/O) interface 1304, a network interface 1306, and memory 1308. The memory 1308 may include the following modules.

A spatial audio signal receiving module 1310 is configured to receive a spatial audio signal inside the vehicle sent by the in-vehicle terminal.

A first signal generation module 1312 is configured to, according to the spatial audio signal, separate a continuous speech signal and a corresponding directivity flag signal for a plurality of sound source directions from the spatial audio signal.

A second signal generation module 1314 is configured to, for a sound source direction of the plurality of sound source directions, combine the continuous speech signal with the corresponding directivity flag signal for the sound source direction to generate the speech activation detection signal for the sound source direction.

A speech activation detection signal sending module 1316 is configured to send the speech activation detection signal of the corresponding sound source direction to the in-vehicle terminal.

In example embodiments of the present disclosure, the spatial audio signal includes a plurality of original audio signals collected by a plurality of microphones. The first signal generation module 1312 may include the following.

A direction of arrival of signal estimation sub-module 1318 is configured to, according to the plurality of original audio signals, estimate the signal arrival direction.

A directivity flag signal generation sub-module 1320 is configured to generate the directivity flag signal for the preset sound source direction according to the signal arrival direction and the preset sound source direction.

A continuous speech signal generation sub-module 1322 is configured to perform a beamforming processing on the plurality of original audio signals to generate the continuous speech signal for the sound source direction.

In example embodiments of the present disclosure, the continuous speech signal generation sub-module 1322 may include the following.

A delay difference determination unit 1324 is configured to determine the delay difference between every two signals in the plurality of original audio signals.

A delay compensation unit 1326 is configured to perform the delay compensation on the plurality of original audio signals according to the delay difference between every two signals.

A weighted summation unit 1328 is configured to, after the delay compensation, perform a weighted summation on the plurality of original audio signals to generate the continuous speech signal for the sound source direction.

In example embodiments of the present disclosure, the second signal generation module 1314 includes the following.

A directivity flag signal determination sub-module 1330 is configured to determine the directivity flag signal corresponding to each frame of the continuous speech signal.

A speech signal determination sub-module 1332 is configured to determine each frame of the continuous speech signal as the speech signal or the non-speech signal frame by frame.

A speech signal setting sub-module 1334 is configured to, according to the determination result of each frame of the continuous speech signal and the corresponding directivity flag signal, determine each frame of the continuous speech signal as the speech signal or the non-speech signal.

A speech activation detection signal determination sub-module 1336 is configured to determine the signal in each frame of the continuous speech signal that is set to be the speech signal as the speech activation detection signal.

In example embodiments of the present disclosure, the device 1300 may further include the following.

A non-speech segment duration determination module 1338 is configured to determine the duration of the non-speech segment after the speech signal setting sub-module 1334 determines each frame of the continuous speech signal as the speech signal or the non-speech signal according to the determination result of each frame of the continuous speech signal and the corresponding directivity flag signal. The non-speech segment is a segment composed of each successive frame of the continuous speech signal that is set to be the non-speech signal.

A speech signal setting module 1340 is configured to set each frame of the continuous speech signal in the non-speech segment of which the duration is less than the first preset threshold to be the speech signal.

In an example of embodiments of the present disclosure, the directivity flag signal indicates that there is the speech signal or the non-speech signal at the time of each frame. The speech signal setting sub-module 1334 may include the following.

A first speech signal setting unit 1342 is configured to set the current frame of the continuous speech signal to be the speech signal if the determination result of the current frame of the continuous speech signal is the speech signal, and the corresponding directivity flag signal indicates that there is the speech signal at the time of the current frame.

In another example of embodiments of the present disclosure, the directivity flag signal indicates that there is the speech signal or the non-speech signal at the time of each frame. The speech signal setting sub-module 1334 may include the following.

A second speech signal setting unit 1344 is configured to set the current frame of the continuous speech signal to be the speech signal if the determination result of the current frame of the continuous speech signal is the speech signal, or the corresponding directivity flag signal indicates that there is the speech signal at the time of the current frame.

In example embodiments of the present disclosure, the speech signal determination sub-module 1332 may include the following.

A speech signal determination unit 1346 is configured to input the continuous speech signal into a preset neural network model and determine each frame of the continuous speech signal as the speech signal or the non-speech signal frame by frame.

In example embodiments of the present disclosure, the device may further include the following.

A non-speech indication segment duration determination module 1338 is configured to determine the duration of the non-speech indication segment prior to the directivity flag signal determination sub-module 1330 determines the directivity flag signal corresponding to each frame of the continuous speech signal. The non-speech indication segment is composed of the continuous directivity flag signal indicating that there is the non-speech signal at the time of the current frame.

A directivity flag signal setting module 1340 is configured to set the directivity flag signal of each frame of the non-speech indication segment having a duration less than a second preset threshold to indicate that there is the speech signal at the time of the current frame.

For the device embodiments, since they are basically similar to the method embodiments, the description is relatively simple, and the relevant parts may be referred to the description of the method embodiments.

Embodiments of the present disclosure also provide a device, which includes the following:

One or more processors; and

One or more machine-readable media stored thereon instructions that, when executed by the one or more processors, cause the device to perform methods of embodiments of the present disclosure.

Embodiments of the present disclosure one or more machine-readable media stored thereon instructions that, when executed by the one or more processors, cause the device to perform methods of embodiments of the present disclosure.

Various embodiments in the present specification are described in a progressive manner. Each embodiment focuses on differences from other embodiments. The same or similar parts shared among various embodiments may be referred to each other.

Those skilled in the art will appreciate that embodiments of the present disclosure may be provided as a method, an apparatus, or a computer program product. Thus, the embodiments of the present disclosure may employ an entire hardware embodiment, an entire software embodiment, or a combination in the form of an embodiment of the software and hardware aspects. Also, the embodiments of the present disclosure may employ the form of the computer program product implemented on one or more computer-usable storage media (including but not limited to disk storage, CD-ROM, optical storage, etc.) including the computer-readable program code stored thereon.

The embodiments of the present disclosure are described with reference to flowcharts and/or block diagrams of methods, terminal devices (systems), and computer program products according to the embodiments of the present disclosure. It should be understood that each process and/or block in flowcharts and/or block diagrams, and the combination of processes and/or blocks in flowcharts and/or block diagrams may be implemented by computer program instructions. Computer program instructions may be provided to a general purpose computer, a special purpose computer, an embedded processor, or the processor of other programmable data processing terminal devices to generate a machine, such that instructions executed by the computer or the processor of other programmable data processing terminal devices are generated for implementing the device with functions specified in one or more processes in flowcharts and/or one more blocks in block diagrams.

The computer program instructions may also be stored in a computer-readable media that can direct a computer or other programmable data processing terminal device to operate in a particular manner, such that instructions stored in the computer-readable memory produce an article of manufacture comprising the instruction device. The instruction device implements functions specified in one or more processes in flowcharts and/or one more blocks in block diagrams. The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The computer program instructions may also be loaded onto a computer or other programmable data processing terminal devices such that a series of operational steps are performed on the computer or other programmable terminal devices to produce computer-implemented processing. As such, the instructions executed on the computer or other programmable terminal devices provide the steps for implementing functions specified in one or more processes in flowcharts and/or one more blocks in block diagrams.

Although preferred embodiments of the present disclosure have been described, those skilled in the art may be able to make additional changes and modifications to the embodiments once knowing the present disclosure. Therefore, the appended claims are intended to be interpreted as including the preferred embodiments and all changes and modifications that fall within the scope of the embodiments.

Finally, it should also be noted that in this context, relational terms such as the first and the second are used merely to distinguish one entity or operation from another entity or operation, without necessarily requiring or implying any actual relationship or order between the entities or operations. Also, terms "including", "comprising" or any other variations thereof are intended to encompass non-exclusive inclusions, such that the process, method, or the terminal device includes not only those elements, but also other elements not explicitly listed, or elements that are inherent to such process, method, article, or terminal device. Without further restrictions, an element defined by the statement "including a . . . " does not preclude the existence of additional identical elements in the process, method, article, or terminal device that includes the element.

The above is a detailed description of a speech signal recognition method and a speech signal recognition device provided by the present disclosure. The principle and implementation of the present disclosure are described with reference to specific examples. The above descriptions of embodiments are only used to help understand the present disclosure. Meanwhile, for those of ordinary skill in the art, according to the present disclosure, there may be changes in terms of specific embodiments and the application scope thereof. In summary, the contents of the specification should not be construed as limiting the application.

EXAMPLE CLAUSES

Clause 1. A speech signal recognition method, characterized in that the method comprises: obtaining a spatial audio signal in designated space; according to the spatial audio signal, separating a continuous speech signal and a corresponding directivity flag signal for a plurality of sound source directions from the spatial audio signal; and for a sound source direction of the plurality of sound source directions, combining the continuous speech signal with the corresponding directivity flag signal for the sound source direction to generate a speech activation detection signal for the sound source direction.

Clause 2. The method according to clause 1, characterized in that, the spatial audio signal includes a plurality of original audio signals collected by a plurality of microphones; the step of according to the spatial audio signal, separating the continuous speech signal and the corresponding directivity flag signal for the plurality of sound source directions from the spatial audio signal comprises: according to the plurality of original audio signals, estimating a signal arrival direction; according to the signal arrival direction and a preset sound source direction, generating the directivity flag signal for a preset sound source direction; and performing a beamforming processing on the plurality of original audio signals to generate the continuous speech signal for the sound source direction.

Clause 3. The method according to clause 2, characterized in that, the step of performing the beamforming processing on the plurality of original audio signals to generate the continuous speech signal for the sound source direction comprises: determining a delay difference between every two signals in the plurality of original audio signals; performing a delay compensation on the plurality of original audio signals according to the delay difference between every two signals; and performing a weighted summation on the plurality of original audio signals after the delay compensation to generate the continuous speech signal for the sound source direction.

Clause 4. The method according to clause 1, characterized in that, the step of for a sound source direction of the plurality of sound source directions, combining the continuous speech signal with the corresponding directivity flag signal for the sound source direction to generate a speech activation detection signal for the sound source direction comprises: determining the directivity flag signal corresponding to each frame of the continuous speech signal; determining each frame of the continuous speech signal as a speech signal or a non-speech signal frame by frame; according to a determination result of each frame of the continuous speech signal and the corresponding directivity flag signal, setting each frame of the continuous speech signal as the speech signal or the non-speech signal; and determining a signal in each frame of the continuous speech signal that is set to be the speech signal as a speech activation detection signal.

Clause 5. The method according to clause 4, characterized in that, after according to the determination result of each frame of the continuous speech signal and the corresponding directivity flag signal, setting each frame of the continuous speech signal as the speech signal or the non-speech signal, the method further comprises: determining a duration of a non-speech segment, the non-speech segment being a segment composed of each successive frame of the continuous speech signal that is set to be the non-speech signal; and setting each frame of the continuous speech signal in the non-speech segment with the duration less than a first preset threshold to be the speech signal.

Clause 6. The method according to clause 4, characterized in that, the directivity flag signal indicates that there is the speech signal or the non-speech signal at a time of each frame; the step of according to the determination result of each frame of the continuous speech signal and the corresponding directivity flag signal, setting each frame of the continuous speech signal as the speech signal or the non-speech signal comprises: if the determination result of a current frame of the continuous speech signal is the speech signal, and the corresponding directivity flag signal indicates that there is the speech signal at the time of the current frame, setting the current frame of the continuous speech signal to be the speech signal.

Clause 7. The method according to clause 4, characterized in that, the directivity flag signal indicates that there is the speech signal or the non-speech signal at a time of each frame; the step of according to the determination result of each frame of the continuous speech signal and the corresponding directivity flag signal, setting each frame of the continuous speech signal as the speech signal or the non-speech signal comprises: if the determination result of the current frame of the continuous speech signal is the speech signal, or the corresponding directivity flag signal indicates that there is the speech signal at the time of the current frame, setting the current frame of the continuous speech signal to be the speech signal.

Clause 8. The method according to clause 4, characterized in that, the step of determining each frame of the continuous speech signal as the speech signal or the non-speech signal frame by frame comprises: inputting the continuous speech signal into a preset neural network model; and determining each frame of the continuous speech signal as the speech signal or the non-speech signal frame by frame.

Clause 9. The method according to clause 4, characterized in that, prior to determining the directivity flag signal corresponding to each frame of the continuous speech signal, the method further comprises: determining a duration of the non-speech indication segment, the non-speech indication segment being composed of the continuous directivity flag signal indicating that there is the non-speech signal at the time of the current frame; and setting the directivity flag signal of each frame of the non-speech indication segment having the duration less than a second preset threshold to indicate that there is the speech signal at the time of the current frame.

Clause 10. A speech signal recognition method, characterized in that the method comprises: obtaining a spatial audio signal in a vehicle; according to the spatial audio signal, separating a continuous speech signal and a corresponding directivity flag signal for a plurality of sound source directions from the spatial audio signal; and for a sound source direction of the plurality of sound source directions, combining the continuous speech signal with the corresponding directivity flag signal for the sound source direction to generate a speech activation detection signal for the sound source direction.

Clause 11. The method according to clause 10, characterized in that, the spatial audio signal includes a plurality of original audio signals collected by a plurality of microphones; the step of according to the spatial audio signal, separating the continuous speech signal and the corresponding directivity flag signal for a plurality of sound source directions from the spatial audio signal comprises: according to the plurality of original audio signals, estimating a signal arrival direction; according to the signal arrival direction and a preset sound source direction, generating the directivity flag signal for the preset sound source direction; and performing a beamforming processing on the plurality of original audio signals to generate the continuous speech signal for the sound source direction.

Clause 12. The method according to clause 11, characterized in that, the step of performing a beamforming processing on the plurality of original audio signals to generate the continuous speech signal for the sound source direction comprises: determining a delay difference between every two signals in the plurality of original audio signals; performing a delay compensation on the plurality of original audio signals according to the delay difference between every two signals; and performing a weighted summation on the plurality of original audio signals after the delay compensation to generate the continuous speech signal for the sound source direction.

Clause 13. The method according to clause 10, characterized in that, the step of for the sound source direction of the plurality of sound source directions, combining the continuous speech signal with the corresponding directivity flag signal for the sound source direction to generate the speech activation detection signal for the sound source direction comprises: determining the directivity flag signal corresponding to each frame of the continuous speech signal; determining each frame of the continuous speech signal as a speech signal or a non-speech signal frame by frame; according to a determination result of each frame of the continuous speech signal and the corresponding directivity flag signal, setting each frame of the continuous speech signal as the speech signal or the non-speech signal; and determining a signal in each frame of the continuous speech signal that is set to be the speech signal as a speech activation detection signal.

Clause 14. The method according to clause 13, characterized in that, after according to the determination result of each frame of the continuous speech signal and the corresponding directivity flag signal, setting each frame of the continuous speech signal as the speech signal or the non-speech signal, the method further comprises: determining a duration of a non-speech segment, the non-speech segment being a segment composed of each successive frame of the continuous speech signal that is set to be the non-speech signal; and setting each frame of the continuous speech signal in the non-speech segment with the duration less than a first preset threshold to be the speech signal.

Clause 15. The method according to clause 13, characterized in that, the step of determining each frame of the continuous speech signal as the speech signal or the non-speech signal frame by frame comprises: inputting the continuous speech signal into a preset neural network model; and determining each frame of the continuous speech signal as the speech signal or the non-speech signal frame by frame.

Clause 16. The method according to clause 13, characterized in that, prior to determining the directivity flag signal corresponding to each frame of the continuous speech signal, the method further comprises: determining a duration of the non-speech indication segment, the non-speech indication segment being composed of the continuous directivity flag signal indicating that there is the non-speech signal at the time of the current frame; and setting the directivity flag signal of each frame of the non-speech indication segment having the duration less than a second preset threshold to indicate that there is the speech signal at the time of the current frame.

Clause 17. A speech signal recognition method, characterized in that, the method comprises: receiving a spatial audio signal inside a vehicle sent by an in-vehicle terminal; according to the spatial audio signal, separating a continuous speech signal and a corresponding directivity flag signal for a plurality of sound source directions from the spatial audio signal; for a sound source direction of the plurality of sound source directions, a continuous speech signal for the sound source direction is combined with a corresponding directivity flag signal to generate a speech activation detection signal for the sound source direction; and sending the speech activation detection signal for the sound source direction to the in-vehicle terminal.

Clause 18. The method according to clause 17, characterized in that, the spatial audio signal includes a plurality of original audio signals collected by a plurality of microphones; the step of according to the spatial audio signal, separating the continuous speech signal and the corresponding directivity flag signal for a plurality of sound source directions from the spatial audio signal includes: according to the plurality of original audio signals, estimating a signal arrival direction; according to the signal arrival direction and a preset sound source direction, generating the directivity flag signal for the preset sound source direction; performing a beamforming processing on the plurality of original audio signals to generate the continuous speech signal for the sound source direction.

Clause 19. The method according to clause 18, characterized in that, the step of performing a beamforming processing on the plurality of original audio signals to generate the continuous speech signal for the sound source direction comprises: determining a delay difference between every two signals in the plurality of original audio signals; performing a delay compensation on the plurality of original audio signals according to the delay difference between every two signals; performing a weighted summation on the plurality of original audio signals after the delay compensation to generate the continuous speech signal for the sound source direction.

Clause 20. The method according to clause 17, characterized in that, the step of for a sound source direction of the plurality of sound source directions, combining the continuous speech signal with the corresponding directivity flag signal for the sound source direction to generate a speech activation detection signal for the sound source direction comprises: determining the directivity flag signal corresponding to each frame of the continuous speech signal; determining each frame of the continuous speech signal as a speech signal or a non-speech signal frame by frame; according to a determination result of each frame of the continuous speech signal and the corresponding directivity flag signal, setting each frame of the continuous speech signal as the speech signal or the non-speech signal; and determining a signal in each frame of the continuous speech signal that is set to be the speech signal as a speech activation detection signal.

Clause 21. The method according to clause 20, characterized in that, after according to the determination result of each frame of the continuous speech signal and the corresponding directivity flag signal, setting each frame of the continuous speech signal as the speech signal or the non-speech signal, the method further comprises: determining a duration of a non-speech segment; the non-speech segment being a segment composed of each successive frame of the continuous speech signal that is set to be the non-speech signal; and setting each frame of the continuous speech signal in the non-speech segment with the duration less than a first preset threshold to be the speech signal.

Clause 22. The method according to clause 20, characterized in that, the step of determining each frame of the continuous speech signal as the speech signal or the non-speech signal frame by frame comprises: inputting the continuous speech signal into a preset neural network model; and determining each frame of the continuous speech signal as the speech signal or the non-speech signal frame by frame.

Clause 23. The method according to clause 20, characterized in that, prior to determining the directivity flag signal corresponding to each frame of the continuous speech signal, the method further comprises: determining a duration of the non-speech indication segment, the non-speech indication segment being composed of the continuous directivity flag signal indicating that there is the non-speech signal at the time of the current frame; and setting the directivity flag signal of each frame of the non-speech indication segment having the duration less than a second preset threshold to indicate that there is the speech signal at the time of the current frame.

Clause 24. A speech signal recognition device, characterized in that, the device comprises: a spatial audio signal acquisition module configured to obtain a spatial audio signal in a designated space; a first signal generation module configured to, according to the spatial audio signal, separate a continuous speech signal and a corresponding directivity flag signal for a plurality of sound source directions from the spatial audio signal; and the second signal generation module configured to, for a sound source direction of the plurality of sound source directions, combine the continuous speech signal and the corresponding directivity flag signal for the sound source direction to generate a speech activation detection signal for the sound source direction.

Clause 25. A speech signal recognition device, characterized in that, the device comprises: a spatial audio signal acquisition module configured to obtain a spatial audio signal inside the vehicle; a first signal generation module configured to, according to the spatial audio signal, separate a continuous speech signal and a corresponding directivity flag signal for a plurality of sound source directions from the spatial audio signal; and a second signal generation module configured to, for a sound source direction of the plurality of sound source directions, combine the continuous speech signal with the corresponding directivity flag signal for the sound source direction to generate a speech activation detection signal for the sound source direction.

Clause 26. A speech signal recognition device, characterized in that, the device comprises: a spatial audio signal receiving module configured to receive a spatial audio signal inside a vehicle sent by an in-vehicle terminal; a first signal generation module configured to, according to the spatial audio signal, separate a continuous speech signal and a corresponding directivity flag signal for a plurality of sound source directions from the spatial audio signal; a second signal generation module configured to, for a sound source direction of the plurality of sound source directions, combine the continuous speech signal with the corresponding directivity flag signal for the sound source direction to generate a speech activation detection signal for the sound source direction; and a speech activation detection signal sending module configured to send the speech activation detection signal of the corresponding sound source direction to the in-vehicle terminal.

Clause 27. A device, characterized in that, the device comprises: one or more processors; and one or more machine-readable media stored thereon instructions that, when executed by the one or more processors, cause the device to perform one or more methods of clauses 1-9, 10-16, or 17-23.

Clause 28. One or more machine-readable media, stored thereon instructions that, when executed by the one or more processors, cause the device to perform one or more methods of clauses 1-9, 10-16, or 17-23.

What is claimed is:

1. A method, comprising:
    obtaining a spatial audio signal including a plurality of original audio signals collected by a plurality of audio signal collection devices comprising at least one audio signal collection device placed at each of a driver's seat, a front passenger seat, and a back seat of a vehicle, each audio signal collection device being placed to collect a different speech signal;
    separating a continuous speech signal and a corresponding directivity flag signal for each of a plurality of sound source directions from the spatial audio signal, including at least separating a continuous speech signal and a directivity flag signal for the driver's seat and separating a continuous speech signal and a directivity flag signal for the front passenger seat, each directivity flag signal indicating, at a time point, whether there is a speech signal in a respective sound source direction at the time point; and
    combining each continuous speech signal with the corresponding directivity flag signal for the respective sound source direction at times indicated by the corresponding directivity flag signal without combining the continuous speech signal with directivity flag signals for any other sound source direction, to generate at least a speech activation detection signal for the driver's seat and a speech activation detection signal for the front passenger seat such that each speech activation detection signal has directivity;
    wherein separating the continuous speech signal and the corresponding directivity flag signal for a sound source direction from the spatial audio signal comprises:
        estimating a signal arrival direction for a sound source direction;
        according to the signal arrival direction for the preset sound source direction, generating the directivity flag signal for the preset sound source direction; and
        performing a beamforming processing on the plurality of original audio signals to generate the continuous speech signal for the sound source direction;
    wherein performing the beamforming processing on the plurality of original audio signals to generate the continuous speech signal for the sound source direction comprises:
        determining a delay difference between every two signals in the plurality of original audio signals;
        performing a delay compensation on the plurality of original audio signals according to the delay difference between every two signals in the plurality of original audio signals to generate a plurality of synchronized audio signals; and
        performing a weighted summation on the plurality of synchronized audio signals to generate the continuous speech signal for the sound source direction; and
    wherein combining the continuous speech signal with the corresponding directivity flag signal for the sound source direction to generate a speech activation detection signal for the sound source direction comprises:
        determining the directivity flag signal corresponding to respective frame of the continuous speech signal in a frame-by-frame manner;
        obtaining a determination result by determining respective frame of the continuous speech signal as a speech signal or a non-speech signal in a frame-by-frame manner;

according to both a determination result of the respective frame as a speech signal and the corresponding directivity flag signal of the respective frame indicating that there is a speech signal at a time of the respective frame, setting respective frame of the continuous speech signal as the speech signal or the non-speech signal; and determining a signal in respective frame of the continuous speech signal that is set to be the speech signal as a speech activation detection signal.

2. The method of claim 1, wherein after setting respective frame of the continuous speech signal as the speech signal or the non-speech signal, the method further comprises:

determining a duration of a non-speech segment, the non-speech segment being a segment composed of respective successive frame of the continuous speech signal that is set to be the non-speech signal; and setting respective frame of the continuous speech signal in the non-speech segment with the duration less than a first preset threshold to be the speech signal.

3. The method of claim 1, wherein the directivity flag signal indicates that there is the speech signal or the non-speech signal at a time of respective frame.

4. The method of claim 3, wherein setting respective frame of the continuous speech signal as the speech signal or the non-speech signal comprises:

if the determination result of a frame of the continuous speech signal is the speech signal, and/or a corresponding directivity flag signal of the frame indicates that there is the speech signal at the time of the frame, setting the frame of the continuous speech signal to be the speech signal.

5. The method of claim 1, wherein obtaining a determination result by determining respective frame of the continuous speech signal as a speech signal or a non-speech signal in a frame-by-frame manner comprises:

inputting the continuous speech signal into a preset neural network model; and determining respective frame of the continuous speech signal as a speech signal or a non-speech signal by the preset neural network model in a frame-by-frame manner.

6. The method of claim 1, wherein prior to determining the directivity flag signal corresponding to respective frame of the continuous speech signal, the method further comprises:

determining a duration of a non-speech indication segment, the non-speech indication segment being composed of a continuous directivity flag signal indicating that there is the non-speech signal at the time of respective frame; and setting the directivity flag signal of respective frame of the non-speech indication segment having the duration less than a second preset threshold to indicate that there is the speech signal at the time of respective frame.

7. A computer-readable storage medium storing computer-readable instructions executable by one or more processors, that when executed by the one or more processors, cause the one or more processors to perform operations comprising:

obtaining a spatial audio signal including a plurality of original audio signals collected by a plurality of audio signal collection devices comprising at least one audio signal collection device placed at each of a driver's seat, a front passenger seat, and a back seat of a vehicle, each audio signal collection device being placed to collect a different speech signal;

separating a continuous speech signal and a corresponding directivity flag signal for each of a plurality of sound source directions from the spatial audio signal, including at least separating a continuous speech signal and a directivity flag signal for the driver's seat and separating a continuous speech signal and a directivity flag signal for the front passenger seat, each directivity flag signal indicating, at a time point, whether there is a speech signal in a respective sound source direction at the time point; and combining each continuous speech signal with the corresponding directivity flag signal for the respective sound source direction at times indicated by the corresponding directivity flag signal without combining the continuous speech signal with directivity flag signals for any other sound source direction, to generate at least a speech activation detection signal for the driver's seat and a speech activation detection signal for the front passenger seat such that each speech activation detection signal has directivity;

wherein separating the continuous speech signal and the corresponding directivity flag signal for a sound source direction from the spatial audio signal comprises:

estimating a signal arrival direction for a sound source direction;

according to the signal arrival direction for the preset sound source direction, generating the directivity flag signal for the preset sound source direction; and performing a beamforming processing on the plurality of original audio signals to generate the continuous speech signal for the sound source direction;

wherein performing the beamforming processing on the plurality of original audio signals to generate the continuous speech signal for the sound source direction comprises:

determining a delay difference between every two signals in the plurality of original audio signals;

performing a delay compensation on the plurality of original audio signals according to the delay difference between every two signals in the plurality of original audio signals to generate a plurality of synchronized audio signals; and performing a weighted summation on the plurality of synchronized audio signals to generate the continuous speech signal for the sound source direction; and wherein combining the continuous speech signal with the corresponding directivity flag signal for the sound source direction to generate a speech activation detection signal for the sound source direction comprises:

determining the directivity flag signal corresponding to respective frame of the continuous speech signal in a frame-by-frame manner;

obtaining a determination result by determining respective frame of the continuous speech signal as a speech signal or a non-speech signal in a frame-by-frame manner;

according to both a determination result of the respective frame as a speech signal and the corresponding directivity flag signal of the respective frame indicating that there is a speech signal at a time of the respective frame, setting respective frame of the continuous speech signal as the speech signal or the non-speech signal; and determining a signal in respective frame of the continuous speech signal that is set to be the speech signal as a speech activation detection signal.

8. The computer-readable storage medium of claim 7, wherein after setting respective frame of the continuous speech signal as the speech signal or the non-speech signal, the operations further comprise:
- determining a duration of a non-speech segment, the non-speech segment being a segment composed of respective successive frame of the continuous speech signal that is set to be the non-speech signal; and
- setting respective frame of the continuous speech signal in the non-speech segment with the duration less than a first preset threshold to be the speech signal.

9. The computer-readable storage medium of claim 7, wherein the directivity flag signal indicates that there is the speech signal or the non-speech signal at a time of respective frame.

10. The computer-readable storage medium of claim 9, wherein setting respective frame of the continuous speech signal as the speech signal or the non-speech signal comprises:
- if the determination result of a frame of the continuous speech signal is the speech signal, and/or a corresponding directivity flag signal of the frame indicates that there is the speech signal at the time of the frame, setting the frame of the continuous speech signal to be the speech signal.

11. An apparatus, comprising,
one or more processors,
memory, coupled to the one or more processors, the memory storing thereon computer-executable instructions that, when executed by the one or more processors, cause the one or more processors to perform acts including:
- obtaining a spatial audio signal including a plurality of original audio signals collected by a plurality of audio signal collection devices comprising at least one audio signal collection device placed at each of a driver's seat, a front passenger seat, and a back seat of a vehicle, each audio signal collection device being placed to collect a different speech signal;
- separating a continuous speech signal and a corresponding directivity flag signal for each of a plurality of sound source directions from the spatial audio signal, including at least separating a continuous speech signal and a directivity flag signal for the driver's seat and separating a continuous speech signal and a directivity flag signal for the front passenger seat, each directivity flag signal indicating, at a time point, whether there is a speech signal in a respective sound source direction at the time point; and
- combining each continuous speech signal with the corresponding directivity flag signal for the respective sound source direction at times indicated by the corresponding directivity flag signal without combining the continuous speech signal with directivity flag signals for any other sound source direction, to generate at least a speech activation detection signal for the driver's seat and a speech activation detection signal for the front passenger seat such that each speech activation detection signal has directivity;

wherein separating the continuous speech signal and the corresponding directivity flag signal for a sound source direction from the spatial audio signal comprises:
- estimating a signal arrival direction for a sound source direction;
- according to the signal arrival direction for the preset sound source direction, generating the directivity flag signal for the preset sound source direction; and
- performing a beamforming processing on the plurality of original audio signals to generate the continuous speech signal for the sound source direction;

wherein performing the beamforming processing on the plurality of original audio signals to generate the continuous speech signal for the sound source direction comprises:
- determining a delay difference between every two signals in the plurality of original audio signals;
- performing a delay compensation on the plurality of original audio signals according to the delay difference between every two signals in the plurality of original audio signals to generate a plurality of synchronized audio signals; and
- performing a weighted summation on the plurality of synchronized audio signals to generate the continuous speech signal for the sound source direction; and wherein combining the continuous speech signal with the corresponding directivity flag signal for the sound source direction to generate a speech activation detection signal for the sound source direction comprises:
- determining the directivity flag signal corresponding to respective frame of the continuous speech signal in a frame-by-frame manner;
- obtaining a determination result by determining respective frame of the continuous speech signal as a speech signal or a non-speech signal in a frame-by-frame manner;
- according to both a determination result of the respective frame as a speech signal and the corresponding directivity flag signal of the respective frame indicating that there is a speech signal at a time of the respective frame, setting respective frame of the continuous speech signal as the speech signal or the non-speech signal; and
- determining a signal in respective frame of the continuous speech signal that is set to be the speech signal as a speech activation detection signal.

* * * * *